(12) United States Patent
Shimada et al.

(10) Patent No.: US 8,686,827 B2
(45) Date of Patent: Apr. 1, 2014

(54) PTC ELEMENT AND HEATING-ELEMENT MODULE

(75) Inventors: Takesha Shimada, Osaka (JP); Kentaro Ino, Osaka (JP); Toshiki Kida, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 48 days.

(21) Appl. No.: 13/639,804

(22) PCT Filed: Apr. 6, 2011

(86) PCT No.: PCT/JP2011/058681
§ 371 (c)(1),
(2), (4) Date: Oct. 5, 2012

(87) PCT Pub. No.: WO2011/126040
PCT Pub. Date: Oct. 13, 2011

(65) Prior Publication Data
US 2013/0037904 A1 Feb. 14, 2013

(30) Foreign Application Priority Data
Apr. 8, 2010 (JP) ................................. 2010-089758

(51) Int. Cl.
*H01C 7/10* (2006.01)
(52) U.S. Cl.
USPC ..................................... 338/22 SD; 338/22 R
(58) Field of Classification Search
USPC .......................................... 338/22 R, 22 SD
See application file for complete search history.

(56) References Cited

FOREIGN PATENT DOCUMENTS

| JP | 48-27556 | 8/1973 |
|----|----------|--------|
| JP | 56-169301 | 12/1981 |
| JP | 2006-179692 | 7/2006 |
| JP | 2008-63188 | 3/2008 |
| WO | WO 2006/118274 | 11/2006 |
| WO | WO 2008/038538 | 4/2008 |

OTHER PUBLICATIONS

PCT/ISA/210; PCT/JP2011/309038; International Search Report (3 pages).
PCT/ISA/210; PCT/JP2007/068501; InternationalSearch Report (3 pages).

*Primary Examiner* — Kyung Lee
(74) *Attorney, Agent, or Firm* — Stein IP, LLC

(57) ABSTRACT

An object is to provide a PTC element that can be made thinner, using a Pb-free semiconductor ceramic composition. The object is achieved with a PTC element including at least two metal electrodes and a $BaTiO_3$ system semiconductor ceramic composition arranged between the electrodes, in which, in the semiconductor ceramic composition, a portion of Ba in the $BaTiO_3$ system is substituted by Bi—Na and a semiconductorizing element, vacancies are formed on Bi sites by depleting at least a portion of Bi, and oxygen defects are formed on a crystal thereof. Since the PTCR characteristic at the inside of the semiconductor ceramic composition is negligibly weak in comparison with the PTCR characteristic at the interface between the semiconductor ceramic composition and the electrodes, the PTC element can be made thinner.

20 Claims, 18 Drawing Sheets

PTC ELEMENT AND HEATING-ELEMENT MODULE

CROSS-REFERENCE TO RELATED APPLICATIONS

This application is a national stage application of PCT Application No. PCT/JP2011/058681, filed Apr. 6, 2011, which claims the benefit of Japanese Application No. 2010-089758, filed Apr. 8, 2010, in the Japanese Intellectual Property Office, the disclosures of which are incorporated herein by reference.

BACKGROUND OF THE INVENTION

1. Field of the Invention

The present invention relates to a PTC (Positive Temperature Coefficient) element having a semiconductor ceramic composition having a positive resistance temperature coefficient, which is used for a PTC thermistor, a PTC heater, a PTC switch, a temperature detector and the like, and a heating-element module using the same.

2. Description of the Related Art

Hitherto, as a semiconductor ceramic composition having a positive resistance temperature coefficient, one described in Patent Document 1 has been known. Since such a semiconductor ceramic composition has a characteristic that a resistance sharply increases at a high temperature more than the Curie point, the composition is used for a PTC thermistor, a PTC heater, a PTC switch, a temperature detector and the like.

Since semiconductor ceramic compositions having a PTCR (Positive Temperature Coefficient of Resistivity) characteristic, which have been currently put to practical use, contain Pb, there is a concern of environmental pollution and hence a Pb-free semiconductor ceramic composition and a PTC element using the same have been desired. Moreover, a light weight and thin type is a trend of the times and thus a PTC element, which is thin and has high withstand voltage, has been desired at uses in high-voltage control systems such as electric vehicles.

Patent Document 1: JP-B-48-27556

SUMMARY OF THE INVENTION

Accordingly, when the present inventors have manufactured various Pb-free semiconductor ceramic compositions and evaluated characteristics thereof, they have found that conventional semiconductor ceramic compositions express the PTCR characteristic attributable to the Schottky barrier at crystal grain boundaries, irrespective of whether the compositions contain Pb or not, but a semiconductor ceramic composition having a specific composition and a specific defect expresses the PTCR characteristic attributable to the Schottky barrier at the interface between an electrode and the semiconductor ceramic composition. They have found that such a substance expressing the PTCR characteristic attributable to the Schottky barrier at the interface between the electrode and the semiconductor ceramic composition has large freedom in element shape and can apply to various devices with processing the substance into various shapes since the withstand voltage does not change with the change in material shape, especially thickness. Thus, they have achieved the invention.

Additional aspects and/or advantages of the invention will be set forth in part in the description which follows and, in part, will be obvious from the description, or may be learned by practice of the invention.

Accordingly, an object of the invention is to provide a PTC element, which is thin and excellent in withstand voltage, using a Pb-free semiconductor ceramic composition.

According to the present invention, the followings are provided in order to solve the above-mentioned object.

(1) A PTC element comprising at least two metal electrodes and a $BaTiO_3$ system semiconductor ceramic composition arranged between the electrodes, wherein, in the semiconductor ceramic composition, a portion of Ba in the $BaTiO_3$ system is substituted by Bi—Na and a semiconductorizing element, vacancies are formed on at least Bi sites, and oxygen defects are formed on a crystal thereof.

(2) The PTC element according to (1), wherein a vacancy content of Bi is more than 5% and 75% or less relative to the Bi sites.

(3) The PTC element according to (1) or (2), wherein the oxygen defects are 10 ppm or less relative to O sites.

(4) The PTC element according to any one of (1) to (3), wherein vacancies are formed on Na sites in addition to the Bi sites and a vacancy content of Na is more than 0% and 60% or less relative to the Na sites.

(5) The PTC element according to any one of (1) to (4), wherein vacancies are formed on Ba sites in addition to the Bi sites and a vacancy content of Ba is more than 0% and 4% or less relative to the Ba sites.

(6) A PTC element comprising at least two metal electrodes and a $BaTiO_3$ system semiconductor ceramic composition arranged between the electrodes, wherein, in the semiconductor ceramic composition, a portion of Ba in the $BaTiO_3$ system is substituted by Bi—Na and a semiconductorizing element, vacancies are formed on at least Bi sites, and oxygen defects are formed on a crystal thereof, and wherein a depletion layer is present in the vicinity of an interface between the metal electrode and the semiconductor ceramic composition.

(7) The PTC element according to (6), wherein the depletion layer is present within 2 µm from the interface between the metal electrode and the semiconductor ceramic composition.

(8) The PTC element according to any one of (1) to (7), which is obtained by laminating the electrodes and the semiconductor ceramic composition.

(9) A heating-element module comprising the PTC element according to any one of (1) to (8) and a power supply electrode provided on the PTC element.

According to the PTC element of the invention, there can be realized a PTC element which expresses a PTCR characteristic by the resistance component at the interface between the semiconductor ceramic composition and the electrode. Namely, the PTCR characteristic of the PTC element of the invention is determined by the resistance component at the interface between the semiconductor ceramic composition and the electrode, and different from conventional semiconductor ceramic compositions in which the PTCR characteristic is determined by the resistance component at crystal grain boundaries at the inside of the composition, the resistance and the jump characteristic are not determined by the thickness and thus a PTC element having high withstand voltage is obtained even in the case of thin one. Therefore, since it is not necessary to thicken the element in order to obtain a predetermined resistance, a PTC element, which has high withstand voltage but is thin, can be realized.

BRIEF DESCRIPTION OF DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
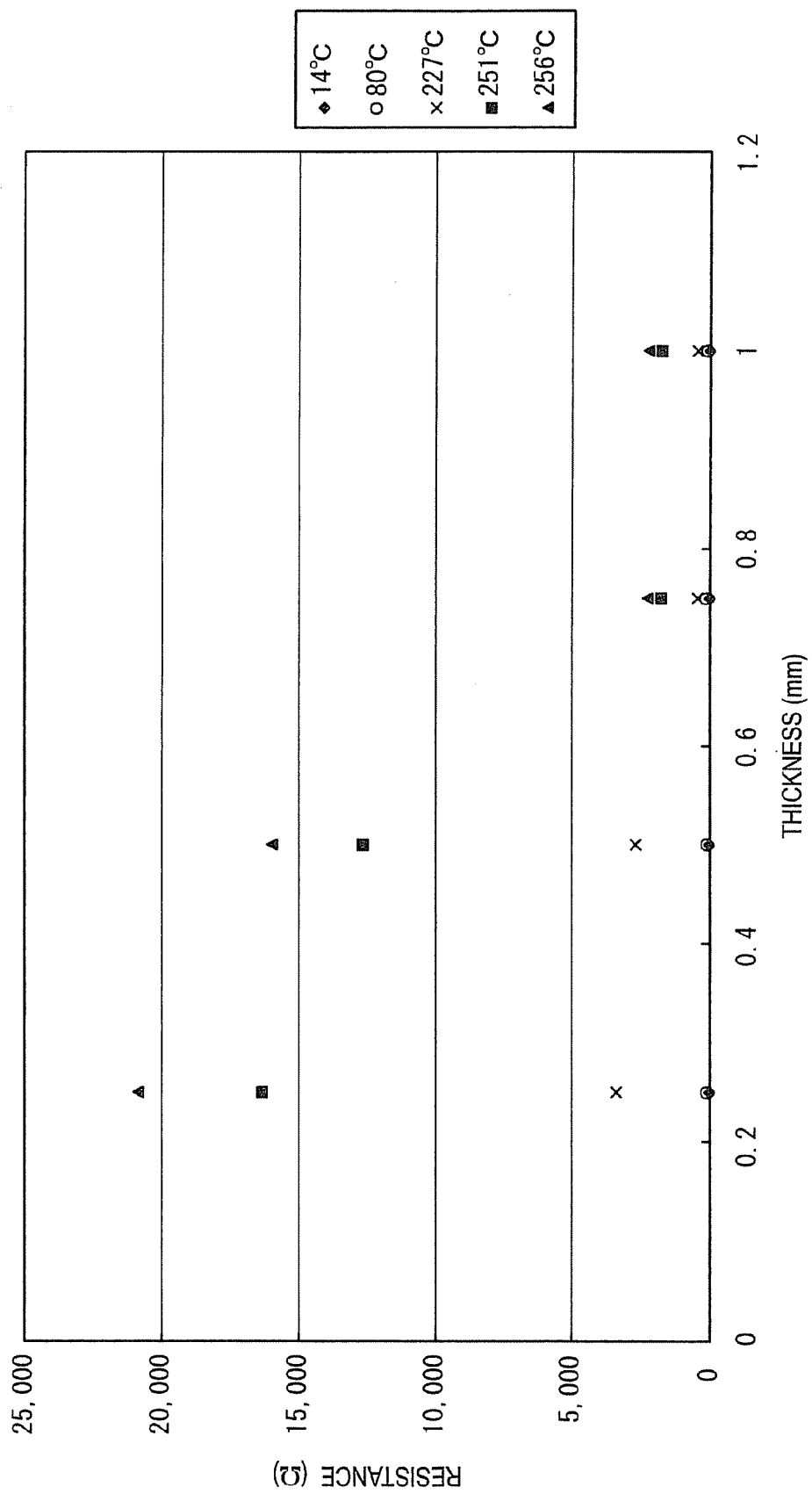
FIG. 1 is a graph showing a relationship among temperature, thickness and resistance, regarding a semiconductor ceramic composition of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Although a few embodiments of the present invention have been shown and described, it would be appreciated by those skilled in the art that changes may be made in this embodiment without departing from the principles and spirit of the invention, the scope of which is defined in the claims and their equivalents.

The PTC element according to the invention is a PTC element including a plurality of electrodes and a $BaTiO_3$ system semiconductor ceramic composition arranged between the electrodes, which expresses a PTCR characteristic by a resistance component in the vicinity of the interface between the semiconductor ceramic composition and the electrode. In such a semiconductor ceramic composition which expresses the PTCR characteristic by the resistance component in the vicinity of the interface between the semiconductor ceramic composition and the electrode, a portion of Ba in the $BaTiO_3$ system semiconductor ceramic composition is substituted by Bi—Na and a semiconductorizing element, vacancies are formed on Bi sites by depleting at least a portion of Bi, and oxygen defects are formed on the crystal thereof.

It is considered that, since the vacancy content of the Bi sites is strongly related to density of state at the interface and gives an influence on the PTCR characteristic, the vacancy content of Bi is preferably more than 5% and 75% or less relative to the Bi sites. The reason is that the Schottky barrier disappears at the interface between the electrode and the PTC element and hence jump is difficult to occur when the vacancy content of Bi is 5% or less, while pores increase (density decreases) to increase room-temperature resistance and evaluation itself becomes difficult to perform when the vacancy content of Bi exceeds 75%. For an auxiliary heater having a room-temperature resistivity of about 70 Ωcm, the vacancy content of Bi is preferably more than 10% and about 35% or less. This is because jump decreases when the vacancy content is 10% or less and the room-temperature resistance begins to increase when it exceeds 35%. It is preferable to make the oxygen defects 10 ppm or less relative to the O sites, by controlling the vacancy content of Bi as above. This is because, when the oxygen defects exceed 10 ppm, carrier electrons pass through a defect level and the jump characteristic decreases.

Moreover, vacancies are formed at both or one of Ba sites and Na sites in addition to the Bi sites. In this case, it is preferred that the vacancy content of Ba is more than 0% and 4% or less relative to the Ba sites, and that the vacancy content of the Na is more than 0% and 60% or less relative to the Na sites. The reason is that a heterogeneous phase increases and semiconductorization becomes difficult when the vacancy content of Ba exceeds 4%, and the content is further preferably 3% or less. With regard to the vacancy content of Na, it is because a heterogeneous phase increases and room-temperature resistance increases when the content exceeds 60%, and the content is further preferably 40% or less.

The following will describe one example of the method for manufacturing the $BaTiO_3$ system semiconductor ceramic composition to be used for the PTC element according to the invention.

First, a $(BaQ)TiO_3$ calcined powder (Q is a semiconductorizing element) is prepared. $BaCO_3$, $TiO_2$ and a raw material powder of the semiconductorizing element, for example $La_2O_3$ are mixed to make a mixed raw material powder, which is then calcined. The calcination temperature is preferably in the range of 900° C. to 1300° C. and the calcination time is preferably 0.5 hour or more. When the calcination temperature is less than 900° C. or the calcination time is less than 0.5 hour, $(BaQ)TiO_3$ is not completely formed and unreacted BaO reacts with water in the atmosphere and the mixing medium to cause deviation in composition, so that the cases are not preferred. Moreover, when the calcination temperature exceeds 1300° C., sintered grains are formed in the calcined powder and hinder the formation of a solid solution with a (Bi—Na)TiO₃ calcined powder to be mixed later, so that the case is not preferred. Furthermore, similarly, BaCO₃, TiO₂ and a semiconductorizing element Nb₂O₅ may be mixed to prepare Ba(TiM)O₃ (M is any semiconductorizing element of Nb, Ta, and Sb). The calcined powder obtained in these steps is referred to as BT calcined powder.

Then, the (Bi—Na)TiO₃ calcined powder is prepared. Na₂CO₃, Bi₂O₃, and TiO₂ as raw powders are mixed to make a mixed raw material powder, which is then calcined. Here, in order to control the vacancy content of Bi, Na₂CO₃ and Bi₂O₃ are blended in amounts deviating from the stoichiometric composition. Furthermore, since the crystal structure cannot be maintained by the control of the stoichiometric composition alone, the calcination time and temperature are also controlled. For example, when Bi is blended in a substoichiometric composition, the vacancy content of Bi increases, and when Na is also blended in an amount smaller than stoichiometric composition, the vacancy content of Na increases. With regard to the calcination time, taking 2 hours at 800° C. as a standard, for example, when the time is changed to 4 hours, the vacancy content of Bi becomes about 1.1 to 1.2 times. When the temperature is changed to 900° C., the content becomes about 1.6 times.

Since Bi₂O₃ has a lowest melting point of about 820° C. among these raw material powders, volatilization by baking is more prone to occur. Thus, the calcination temperature is preferably in the range of 700° C. to 950° C. and the calcination time is preferably 0.5 to 10 hours so that Bi is not volatilized as far as possible and a hyperreaction of Na does not occur. When the calcination temperature is less than 700° C. or the calcination time is less than 0.5 hour, unreacted NaO reacts with water in the atmosphere or a solvent thereof in the case of wet mixing to generate the deviation in composition and fluctuation of characteristics, so that the cases are not preferred. Moreover, when the calcination temperature exceeds 950° C. or the calcination time exceeds 10 hours, the volatilization of Bi proceeds to generate the deviation in composition and the formation of the heterogeneous phase is accelerated, so that the cases are not preferred. The calcined powder obtained in this step is referred to as BNT calcined powder.

In this regard, as the calcination temperature (900° C. to 1300° C.) in the step of preparing the above BT calcined powder and the calcination temperature (700° C. to 950° C.) in the step of preparing the above BNT calcined powder, optimum temperature is properly selected also depending on uses. For example, as for the calcination temperature of BNT, in order to carrying out the reaction sufficiently with suppressing the volatilization of Bi, it is preferred to perform the calcination at a relatively low temperature with adjusting the calcination time. Moreover, the calcination temperature of BNT is preferably set at a temperature lower than the calcination temperature of BT.

The step of preparing the BT calcined powder and the step of preparing the BNT calcined powder are separately conducted (separate calcination method). Thereby, since the volatilization of Bi in BNT in the calcination step can be suppressed and the deviation in composition of Bi—Na can be prevented to suppress the formation of the heterogeneous phase, the room-temperature resistivity can be further lowered and also a semiconductor ceramic composition exhibiting suppressed fluctuation of the Curie temperature can be realized. In order to control the vacancy content of Ba, a method of blending it in an amount deviating from the stoichiometric composition as in the cases of Bi and Na may be adopted but, since Ba is hardly volatilized in the process of the calcination, it may be possible to dissolve Ba in a mixed medium at the time of mixing the BT calcined powder and the BNT calcined powder to be mentioned below.

In the steps of preparing respective calcined powders, at the mixing of raw material powders, pulverization may be performed depending on particle sizes of the raw material powders. Moreover, mixing and pulverization may be any of wet mixing/pulverization using pure water or ethanol and dry mixing/pulverization, but the dry mixing/pulverization is preferred since the deviation in composition can be more effectively prevented. Here, BaCO₃, Na₂CO₃, and TiO₂ are exemplified as the raw material powders but the advantage of the invention is not impaired even when other Ba compounds, Na compounds, and the like are used.

After the BT calcined powder and the BNT calcined powder are separately prepared as mentioned above, respective calcined powders are blended in predetermined amounts and then mixed. The mixing may be either wet mixing using pure water or ethanol or dry mixing, but the dry mixing is preferred since the deviation in composition can be more effectively prevented. Moreover, depending on the particle size of the calcined powder, pulverization may be conducted after the mixing or the mixing and pulverization may be conducted simultaneously. The average particle size of the mixed calcined powder after the mixing and pulverization is preferably 0.6 μm to 1.5 μm.

The mixed calcined powder obtained by the step of mixing the BT calcined powder and the BNT calcined powder is subjected to forming by an appropriate forming method. Before the forming, if necessary, the pulverized powder may be granulated in a granulation apparatus. The density of the formed body after the forming is preferably 2 to 3 g/cm³.

Since the melting point of the BNT calcined powder becomes 1250° C. or higher and is stabilized at a high value, it becomes possible to conduct baking at a higher temperature even when it is mixed with the BT calcined powder. One of advantages of the separate calcination method is to use the BNT calcined powder which suppresses the volatilization of Bi and the superreaction of Na and gives a small deviation in composition of Bi—Na relative to the weighed value.

The sintering is conducted at a sintering temperature of 1200° C. to 1400° C. for a sintering time of 2 hours to 6 hours in the air or a reduction atmosphere or in an inert gas atmosphere having a low oxygen concentration. In the case of performing the granulation before the forming, it is preferred to conduct binder-removing treatment at 300° C. to 700° C. before the sintering.

In the BaTiO₃ system semiconductor ceramic composition to be a subject in the invention, a portion of Ba in BaTiO₃ is substituted by Bi—Na and a semiconductorizing element is further added, thereby performing valence control. In the following embodiments, a semiconductorizing element Q is added to BaTiO₃ to form a (BaQ)TiO₃ calcined powder.

As the semiconductorizing element Q, at least one of La, Dy, Eu, Gd, and Y is preferred. The resulting semiconductor ceramic composition has a compositional formula $[(Bi—Na)_x(Ba_{1-y}Q_y)_{1-x}]TiO_3$ and x and y satisfy the following: $0<x\leq0.2$, $0<y\leq0.02$.

In the semiconductor ceramic composition represented by the above composition $[(Bi—Na)_x(Ba_{1-y}Q_y)_{1-x}]TiO_3$, as the semiconductorizing element Q, La is particularly preferred among La, Dy, Eu, Gd, and Y. In the composition, x represents a component range of Bi+Na and preferably satisfies the following: $0 < x \leq 0.2$. When x is 0, the Curie temperature cannot be shifted to a high temperature side, while when x exceeds 0.2, the room-temperature resistivity approaches to $10^4$ Ω·cm, and it becomes difficult to apply the semiconductor ceramic composition to a PTC heater and the like.

Moreover, in the compositional formula, y represents a component range of Q and preferably satisfies the following: $0 < y \leq 0.02$. This is because the composition is not semiconductorized when y is 0 and the room-temperature resistivity increases when y exceeds 0.02. The valence control is performed by changing the value of y but, when a trivalent cation is added as a semiconductorizing element in the system where a portion of Ba is substituted by Bi—Na, there is a problem that the effect of semiconductorization decreases due to the presence of a monovalent Na ion and the room-temperature resistivity increases. Therefore, a more preferred range is $0.002 \leq y \leq 0.02$. In this regard, the above range of $0.002 \leq y \leq 0.02$ is represented as a range of 0.2 mol % to 2.0 mol % in terms of mol % notation.

By the aforementioned manufacturing method, there can be obtained semiconductor ceramic compositions having a compositional formula $[(Bi—Na)_x(Ba_{1-y}Q_y)_{1-x}]TiO_3$ (Q is at least one of La, Dy, Eu, Gd and Y, and x and y satisfy the following: $0 < x \leq 0.2$, $0 < y \leq 0.02$). These semiconductor ceramic compositions can elevate the Curie temperature and further lower the room-temperature resistivity, without using Pb which causes environmental pollution.

As the semiconductor ceramic composition where a portion of Ba in $BaTiO_3$ is substituted by Bi—Na, use may be also made of a composition where the semiconductorizing element M is Nb, Ta or Sb, and the compositional formula is represented by $[(Bi—Na)_xBa_{1-x}][Ti_{1-z}M_z]O_3$ (where M is at least one of Nb, Ta and Sb), and the above x and z satisfy the following: $0 < x \leq 0.2$, $0 < z \leq 0.005$. Also in this case, the invention can be carried out by a method wherein the blending is conducted for the BNT calcined powder with deviating from the stoichiometric composition as mentioned below.ds

EXAMPLES

A sample having a composition $\{(Ba_{0.994}La_{0.006})_{0.92}(Bi_{0.5}Na_{0.5})_{0.08}\}TiO_{3-\delta}$ (x=0.08, y=0.006) was actually manufactured by the above manufacturing method using La as a semiconductorizing element and subjected to evaluation. The following will describe the details.

Raw material powders of $BaCO_3$, $TiO_2$, and $La_2O_3$ were prepared and these raw material powders were blended so as to be $(Ba_{0.994}La_{0.006})TiO_3$. The blended raw material powder was mixed with pure water and the raw material powder was calcined at 900° C. for 4 hours in the air to obtain a BT calcined powder.

Moreover, raw material powders of $Bi_2O_3$, $Na_2CO_3$, and $TiO_2$ were prepared and then blended so that γ is 0.05 and η is 0.002 in $(Bi_{0.5-\gamma}Na_{0.5-\eta})TiO_3$, and they were mixed in a dry mixer. The resulting mixed raw material powder was calcined at 800° C. for 2 hours in the air to prepare a BNT calcined powder.

The resulting BT calcined powder and BNT calcined powder were blended in a ratio of about 92:8 in terms of molar ratio and were mixed and pulverized in a pot mil using pure water as a medium until a central particle diameter became 0.5 to 2.0 μm. On this occasion, in order to decrease Ba in the BT calcined powder by a predetermined amount, 30 kg of the BT calcined powder was subjected to ball-mil mixing in 100 L of pure water for 6 hours to dissolve Ba into pure water and then the whole was allowed to stand for 12 hours. In the case where a larger amount of Ba is dissolved, the content is regulated by stirring in a pot mil. On this occasion, in order to keep the particle diameter of the BT calcined powder, ball-mil media are not charged.

After the pulverization/control step, the mixed powder of the BT calcined powder and the BNT calcined powder was dried in a hot-air drier. After PVA (polyvinyl alcohol) was added to the mixed powder, which had been mixed and regulated, and the whole was mixed as a slurry, it was granulated by means of a granulation apparatus. The resulting granulated powder was subjected to forming in a uniaxial pressing machine and the formed body was subjected to binder removal at 700° C. and then sintered in nitrogen to obtain a sintered body. The vacancy contents of Bi, Na and Ba in the above sintered body were 18.4% relative to Bi sites, 6.3% relative to Na sites, and 2.5% relative to Ba site, respectively. Moreover, oxygen defects were 1 ppm relative to O sites.

From the obtained sintered body, four plate-like test pieces having sizes of 10 mm×10 mm×1.00 mm, 10 mm×10 mm×0.75 mm, 10 mm×10 mm×0.5 mm, and 10 mm×10 mm×0.25 mm, respectively, were made. On both end faces of the test piece, by a screen printing method, silver-zinc electrodes were formed as ohmic electrodes and silver electrodes were formed as cover electrodes thereon by baking to manufacture a PTC element according to the invention.

<Thickness/Resistance Properties>

The manufactured PTC element was heated from 14° C. to 256° C. and resistances between both electrodes were measured by a four-terminal method, thereby measuring temperature change of the resistances. FIG. 1 shows the results.

Since it can be read from FIG. 1 that a linear relationship stands up between the thickness and the resistance, the measurement data are approximated by a straight line in FIG. 1. When this approximation straight line is represented as $R = a(T) \cdot \Delta t + R_0(T)$ (Δt: thickness, R: resistance of PTC element, a: function of temperature T), the resistance $R_0(T)$ when the thickness Δt is 0 can be theoretically calculated at each temperature. Moreover, it can be also read that the resistance $R_0(T)$ at a thickness of 0 depends on temperature. In this connection, FIG. 2 is a figure in which the resistance $R_0(T)$ at a thickness of 0 is plotted at every temperature.

Figure 2:
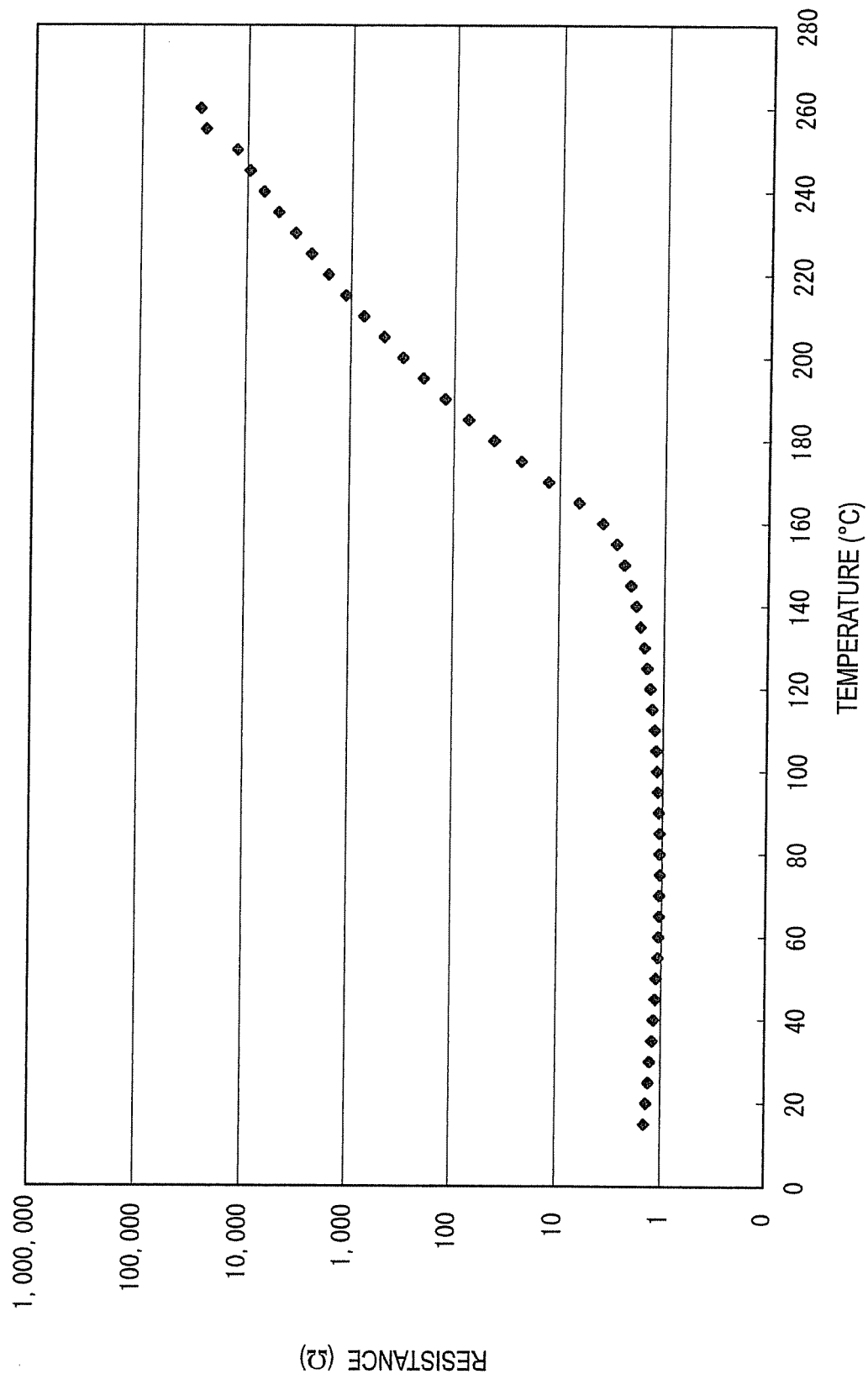
FIG. 2 is a graph showing a relationship between temperature and resistance at a thickness of 0, regarding a semiconductor ceramic composition of the invention.

As in FIG. 2, according to the PTC element of the invention, it is revealed that the PTCR characteristic that the resistance is sharply increased from a predetermined temperature (around 160° C. in the present example) is theoretically expressed at a thickness of 0. In this regard, the resistance $R_0(T)$ at a thickness of 0 is considered to be attributable to the resistance component generated not at the inside of the semiconductor ceramic composition but at the interface between the semiconductor ceramic composition and the electrode. This consideration can be confirmed by the comparison with FIG. 3 which shows the relationship between the thickness and the resistance in a Pb-containing semiconductor ceramic composition.

Figure 3:
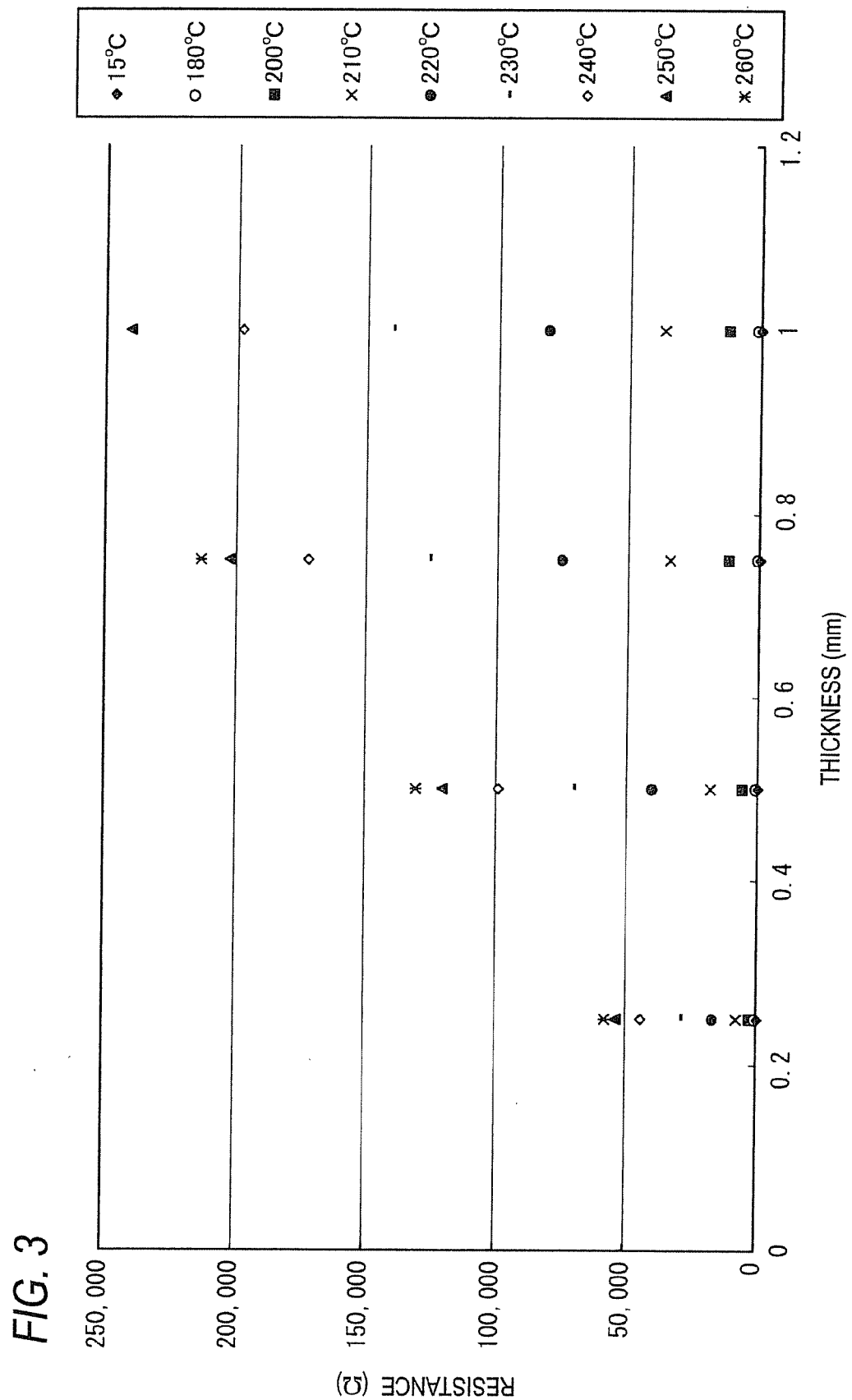
FIG. 3 is a graph showing a relationship among temperature, thickness and resistance, regarding a Pb-containing semiconductor ceramic composition according to Comparative Example.

FIG. 3 shows the relationship between the temperature and the resistance of a PTC element having a Pb-containing semiconductor ceramic composition. Specifically, from a Pb-containing semiconductor ceramic composition $(Ba_{0.65}Sr_{0.12}Ca_{0.06}Pb_{0.17})TiO_3$, plate-like test pieces having sizes of 10 mm×10 mm×1.00 mm, 10 mm×10 mm×0.75 mm, 10 mm×10 mm×0.5 mm, and 10 mm×10 mm×0.25 mm were prepared as mentioned above. Same electrodes were formed on both end faces thereof to manufacture a PTC element, and a graph similar to FIG. 1 was made. Also in FIG. 3, a linear relationship stands up between the thickness and the resistance and an approximation straight line can be introduced but, differently from the PTC element of the invention in FIG. 1, the extrapolated value of the resistance at zero thickness is independent of temperature and is maintained at 0. In this regard, it is considered that a Pb-free semiconductor ceramic composition other than that of the invention also has the same relationship between the temperature and the resistance as in FIG. 3.

From the above comparison between FIG. 1 and FIG. 3, since the resistance increases as the thickness increases in the Pb-containing semiconductor ceramic composition, it is revealed that the jump characteristic is expressed at the inside of the semiconductor ceramic composition. This fact is coincident with the fact that the jump characteristic is expressed at crystal grain boundaries at the inside of the semiconductor ceramic composition. On the other hand, in the PTC element according to the invention, it is supposed that the resistance $R_0(T)$ is present even when the thickness of the semiconductor ceramic composition is 0, and thus a specific phenomenon is shown. With regard to the phenomenon, the jump characteristic is not explained by the mechanism of the Schottky barrier formed at the crystal grain boundaries.

Figure 4:
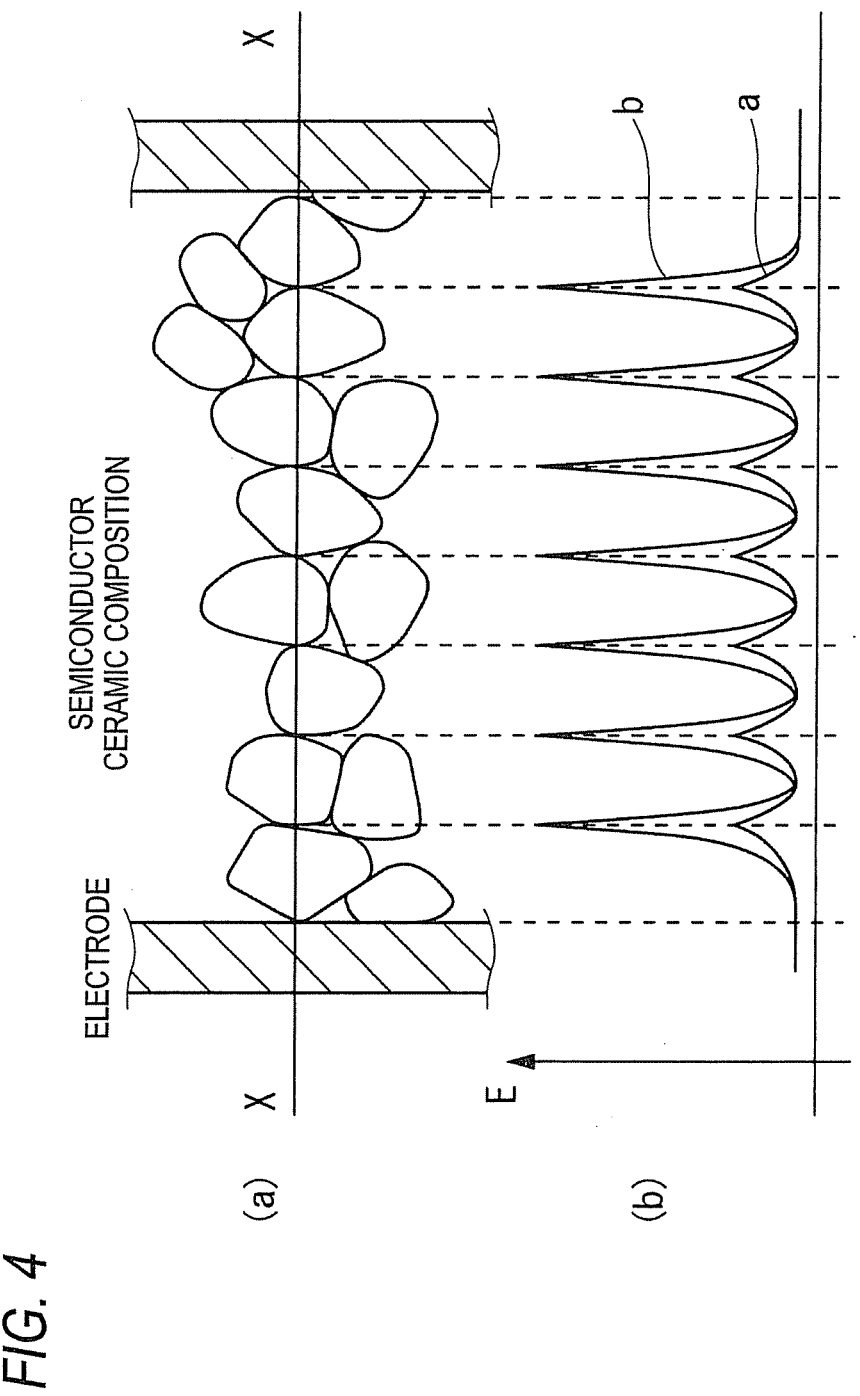
FIG. 4 is a schematic view showing sites at which a jump characteristic of a Pb-containing semiconductor ceramic composition is expressed.
Figure 5:
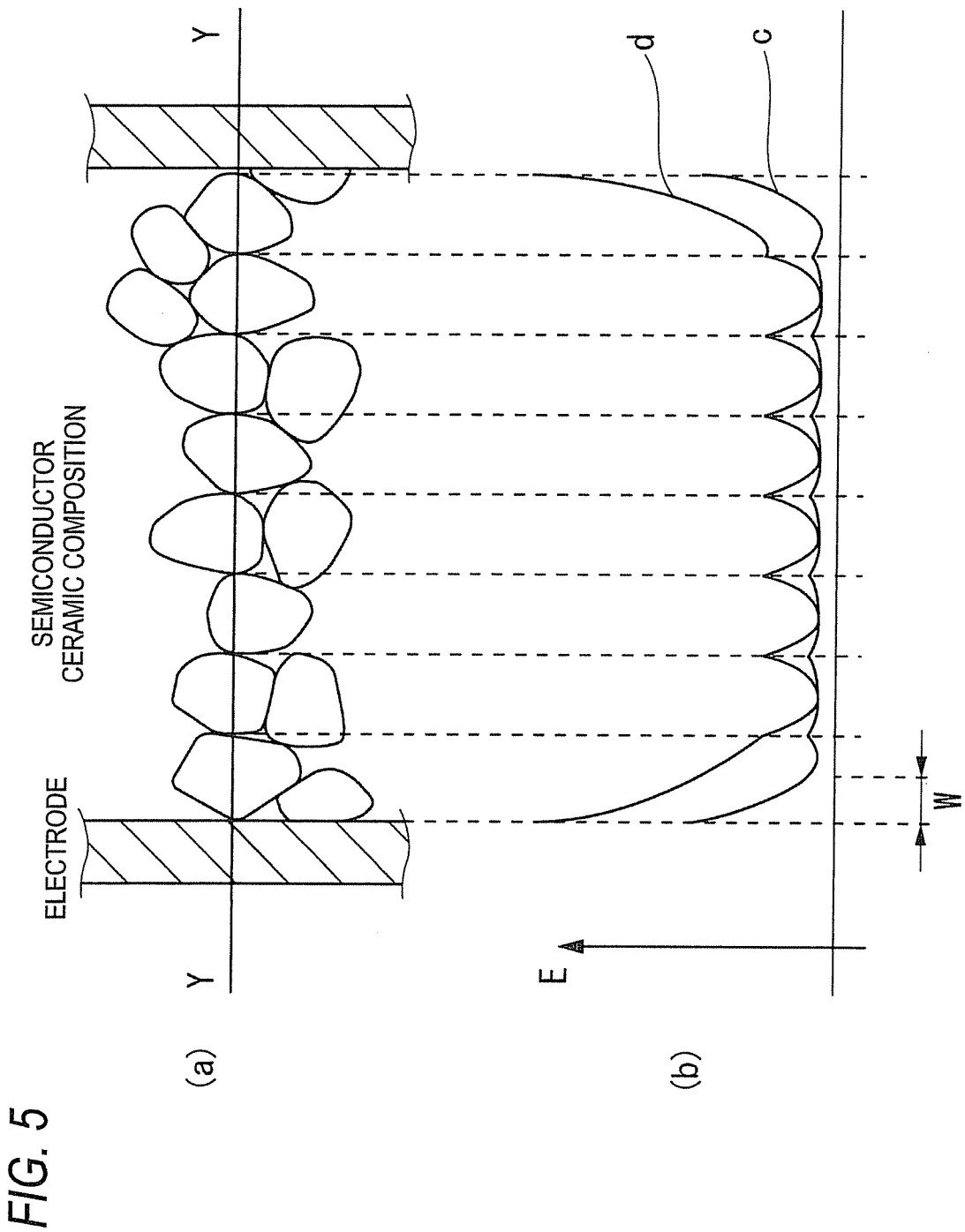
FIG. 5 is a schematic view showing sites at which a jump characteristic of a semiconductor ceramic composition according to the invention is expressed.

From the above comparison between FIG. 1 and FIG. 3, the present inventors have considered that the region where the jump characteristic is expressed is different between the Pb-containing semiconductor ceramic composition and the semiconductor ceramic composition of the application, as shown in FIGS. 4 and 5.

The (a) in FIG. 4 is a schematic view showing a state that a Pb-containing semiconductor ceramic composition comprising a plurality of crystal grains is sandwiched between one pair of electrodes and (b) in FIG. 4 is a schematic view showing an energy potential E on a straight line X-X in (a) in FIG. 4. The curve a in (b) in FIG. 4 represents an energy potential at room temperature and the curve b represents an energy potential at 200° C.

The (a) in FIG. 5 is a schematic view showing a state that a semiconductor ceramic composition of the invention comprising a plurality of crystal grains is sandwiched between one pair of electrodes and (b) in FIG. 5 is a schematic view showing an energy potential E on a straight line Y-Y in (a) in FIG. 5. The curve c in (b) in FIG. 5 represents an energy potential at room temperature and the curve d represents an energy potential at 200° C. Moreover, w in (b) in FIG. 5 represents width of the region which shows the Schottky barrier at the interface between the electrode and the semiconductor ceramic composition.

As shown in (b) in FIG. 4, in the semiconductor ceramic composition which is not inventive one, a large number of crystal grain boundaries are present between the electrodes and there is shown a jump characteristic that the energy potential is remarkably different between at room temperature and at 200° C. at every crystal grain boundary. Therefore, as the thickness of the Pb-containing semiconductor ceramic composition between the electrodes increases, the jump characteristic increases and the resistance also increases. In this regard, the phenomenon that the difference of the energy potential from that at room temperature increases at the crystal grain boundary as the temperature is elevated as above is considered to be similar also in the conventional semiconductor ceramic compositions which do not contain Pb.

On the other hand, as shown in (b) in FIG. 5, in the semiconductor ceramic composition of the invention, the Schottky barrier is generated at the interface between the electrode and the semiconductor ceramic composition and there is shown the jump characteristic that the energy potentials are remarkably different between at room temperature and at 200° C. According to this model, even when the thickness infinitely approaches to 0, an energy potential is generated so long as an interface is present between the electrode and the semiconductor ceramic composition and thus there can be explained the case that the resistance does not become 0 even when the above thickness is 0. Therefore, in the semiconductor ceramic composition of the invention, since the jump characteristic is expressed at the interface between the electrode and the semiconductor ceramic composition shown in (b) in FIG. 5, it is considered that the jump characteristic is not dependent on the thickness and is influenced by the composition of the semiconductor ceramic composition and the electrodes. In this regard, the interface between the electrode and the semiconductor ceramic composition, where the Schottky barrier is generated, means not the interface itself that has no thickness but a region having a width w (for example, 2 μm or less) in a depth direction from the electrode to the semiconductor ceramic composition.

Moreover, in the invention, an energy potential is generated also at the crystal grain boundaries at the inside of the semiconductor ceramic composition but, since such energy potential is small as compared with the energy potential at the interface between the semiconductor ceramic composition and the electrode, the jump characteristic in the semiconductor ceramic composition may be considered to be controlled by the interface between the semiconductor ceramic composition and the electrode.

<Kind of Electrode>

Accordingly, the inventors of the invention have considered that validity of the above model may be proved if the jump characteristic be also changed when the kind of the metal constituting the electrodes is changed, so that the above resistance $R_0(T)$ is investigated with changing the kind of the metal and FIG. 6 to FIG. 10 show the results. In FIG. 6 to FIG. 10, for the PTC elements having a size of 10 mm×10 mm×1.00 mm among the PTC elements measured in FIGS. 1 and 3, the resistance $R_0(T)$ when the thickness is 0 at each temperature is calculated and the relationship between the temperature and the resistance $R_0(T)$ at a thickness of 0 is shown.

Figure 6:
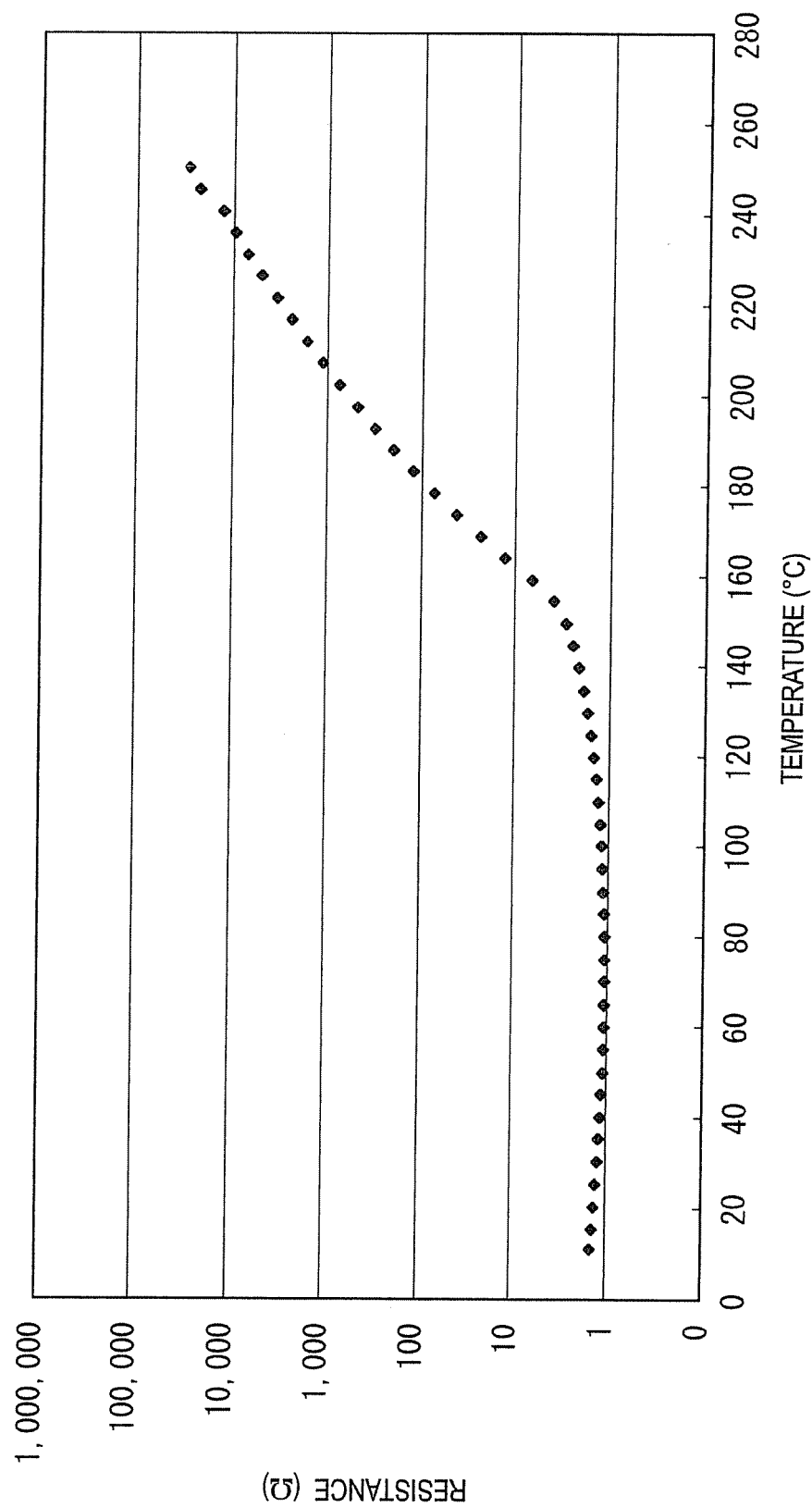
FIG. 6 is a graph showing a relationship between temperature and resistance regarding a semiconductor ceramic composition of the invention.

Here, the PTC element measured in FIG. 6 is one where nickel electrodes were formed as ohmic electrodes by sputtering and silver electrodes were formed thereon as cover electrodes by sputtering and then thermal treatment was performed in the air at 300° C. for 2 hours.

Figure 7:
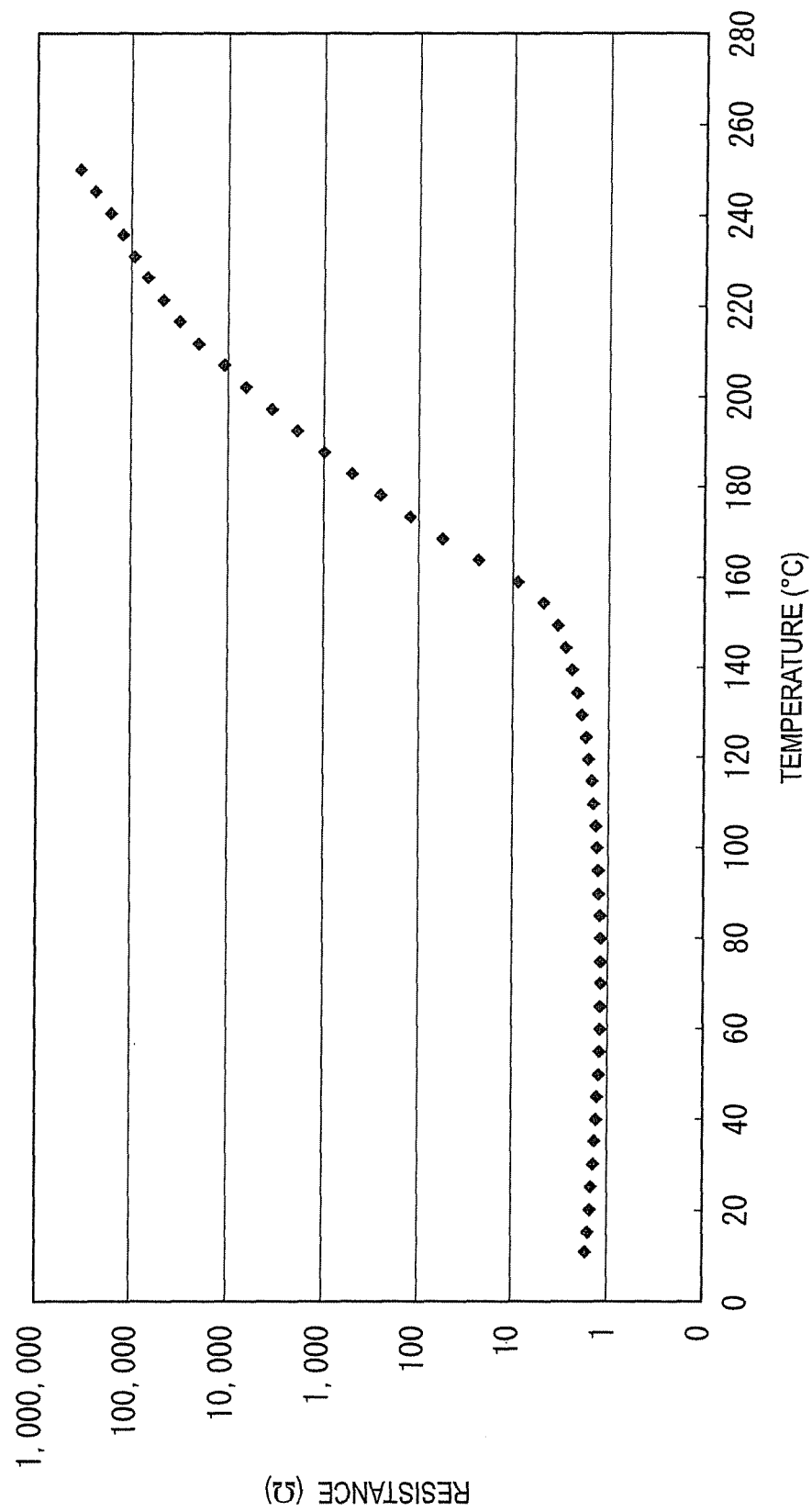
FIG. 7 is a graph showing a relationship between temperature and resistance regarding a semiconductor ceramic composition of the invention.

The PTC element measured in FIG. 7 is one where silver electrodes as cover electrodes and nickel electrodes as ohmic electrodes were formed by sputtering and then thermal treatment was performed in oxygen at 300° C. for 3 hours.

Figure 8:
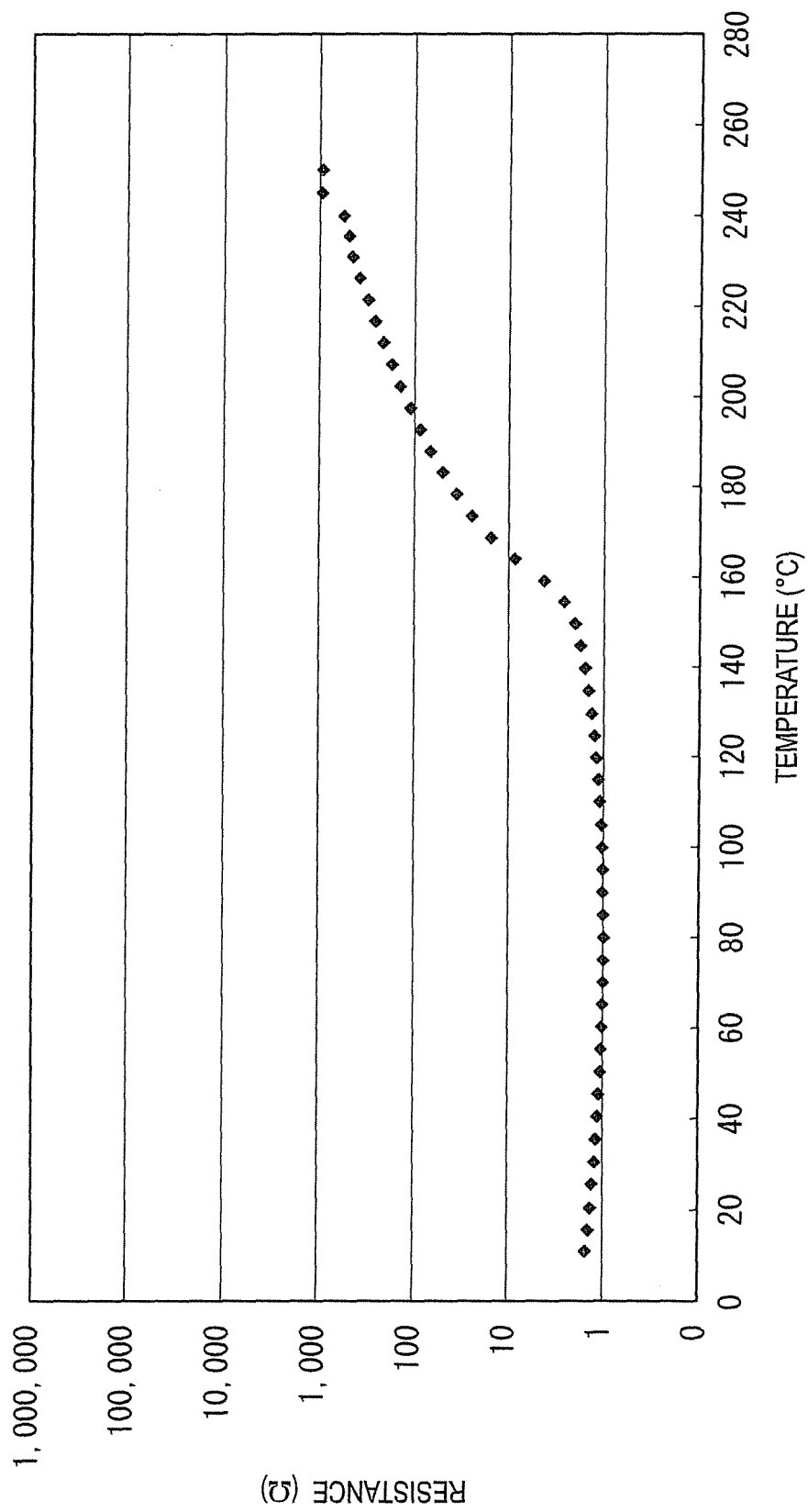
FIG. 8 is a graph showing a relationship between temperature and resistance regarding a semiconductor ceramic composition of the invention.

The PTC element measured in FIG. 8 is one where silver electrodes as cover electrodes and nickel electrodes as ohmic electrodes were formed by sputtering and thermal treatment was not performed.

Figure 9:
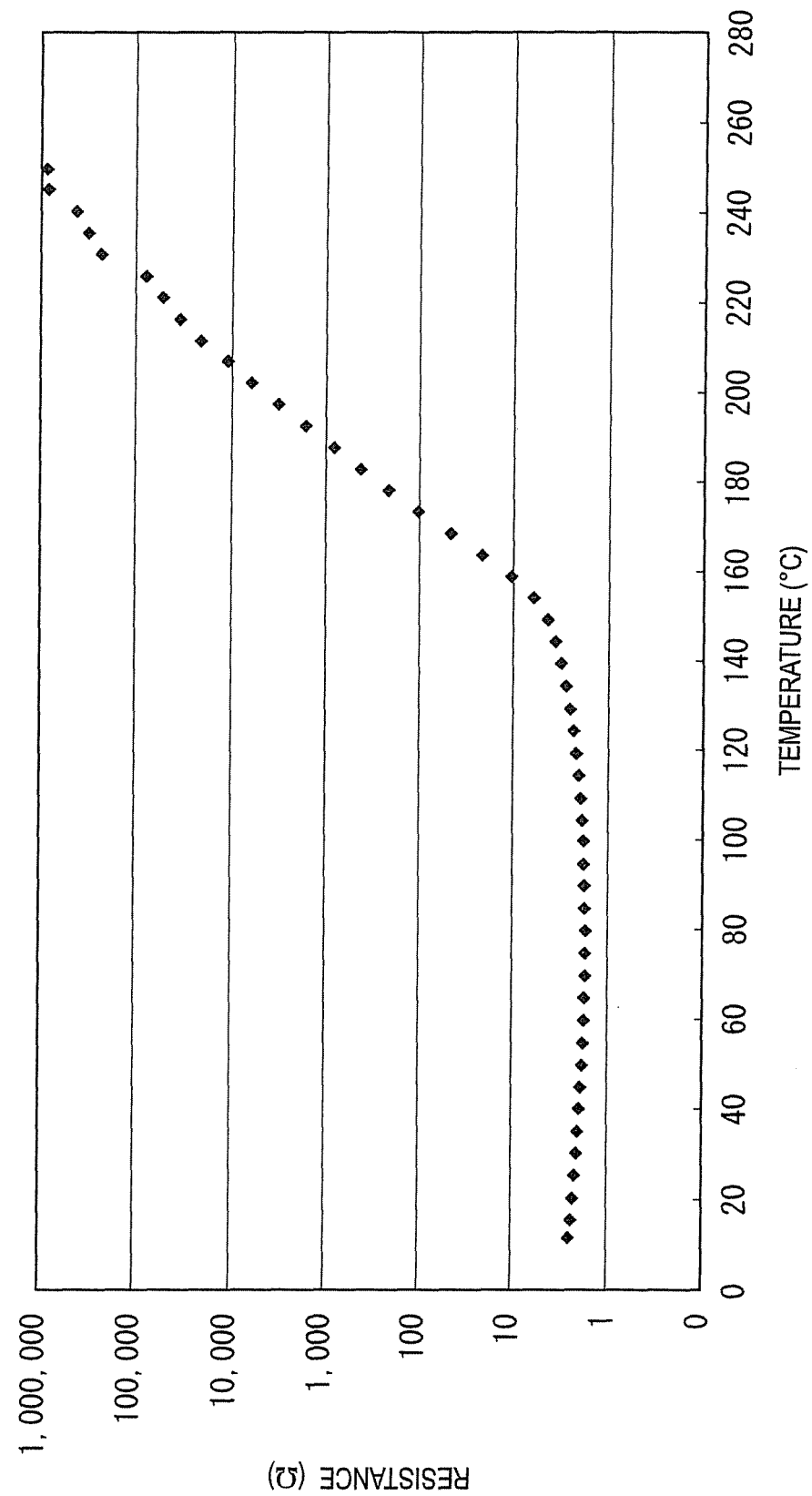
FIG. 9 is a graph showing a relationship between temperature and resistance regarding a semiconductor ceramic composition of the invention.

The PTC element measured in FIG. 9 is one where titanium electrodes as cover electrodes and copper electrodes as ohmic electrodes were formed by sputtering and then thermal treatment was performed in the air at 300° C. for 5 hours.

Figure 10:
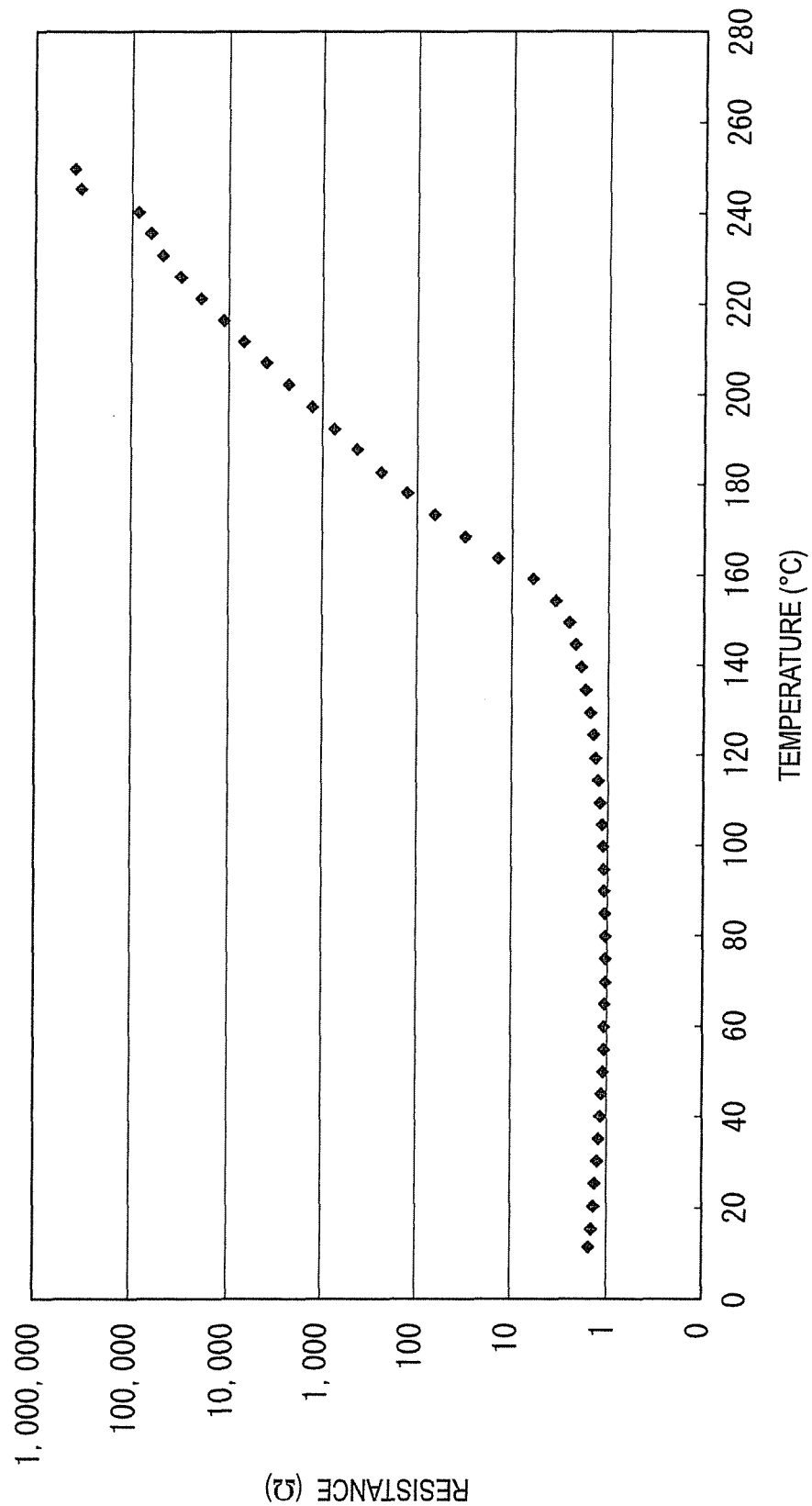
FIG. 10 is a graph showing a relationship between temperature and resistance regarding a semiconductor ceramic composition of the invention.

The PTC element measured in FIG. 10 is one where nickel electrodes as cover electrodes and titanium electrodes as ohmic electrodes were formed by sputtering and then thermal treatment was performed in the air at 300° C. for 5 hours.

From FIG. 3 and FIG. 6 to FIG. 10, according to the PTC elements of the invention, it can be confirmed that the jump characteristic of the resistance by temperature is expressed even when any kind of metal is used as electrodes. Moreover, it can be confirmed that the jump characteristic is changed by the kind of metal and the forming method. Therefore, in the PTC element of the present invention, it is revealed that the jump characteristic is expressed at the interface between the semiconductor ceramic composition and the metal.

[<Multilayer Electrode Structure>

Furthermore, since the resistance component is generated at the interface between the semiconductor ceramic composition and the metal electrode, the room-temperature resistivity $\rho_{25}$, Curie temperature $T_{sc}$, and resistance temperature coefficient α were measured in the case where the interface was increased by providing an intermediate layer electrode. In this regard, the resistance (the whole resistance) in the material and the resistance (resistance $R_0(T)$ at a thickness of 0) at the interface between the electrode and the material were separated from the measured resistance of the semiconductor ceramic composition and a temperature at which the resistance at the interface became twice the resistance at the interface at room temperature was taken as the Curie temperature $T_{sc}$ for convenience.

Figure 11:
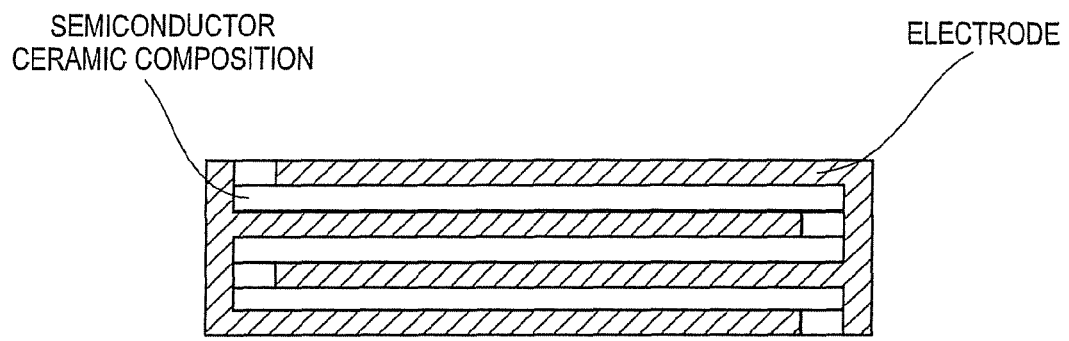
FIG. 11 is a schematic view showing a PTC element having a laminate structure according to the invention.

Table 1 shows measurement results of the room-temperature resistivity $\rho_{25}$, Curie temperature $T_{sc}$, and resistance temperature coefficient α of laminated PTC elements, the elements being formed by using the aforementioned PTC elements used in FIG. 1 and FIG. 2 and laminating one to four pieces of each of the PTC elements having the same thickness as shown in FIG. 11. In each of the laminated PTC element, a positive electrode was formed on one surface of the PTC element by printing and a negative electrode was formed on another surface by printing and a comb-like electrode structure where the positive electrodes were connected one another and the negative electrodes were connected one another with each external electrode was formed. In FIG. 11, three layers of the sheet-like test piece were laminated and silver and zinc were used as the positive electrode and the negative electrode. In this regard, the sheet material having a thickness of about 20 to 200 μm can be used. When the thickness is less than 20 μm, a chemical reaction of the electrode with the material proceeds at the baking to change the characteristics, so that the case is not preferred. In the case where the thickness is 20 μm or more, a sheet of several hundred μm can be manufactured by a doctor blade method or the like. The semiconductor ceramic composition used in the present measurement was one having a Ba vacancy content of 2.21%, an Na vacancy content of 6.44%, a Bi vacancy content of 18.01%, and oxygen defect amount of 1 ppm.

The resistance temperature coefficient α was determined according to the following equation.

$$\alpha = (\ln R2 - \ln R1) \times 100/(T2-T1)$$

T1 is a temperature at which the resistivity exceeds the Curie temperature $T_{sc}$ and becomes twice the room-temperature resistivity $\rho_{25}$, T2 is a temperature at which maximum resistivity is shown, and R1 and R2 each are resistances at temperatures T1 and T2, respectively. The resistance temperature coefficient α is an index that shows how the resistance increases before and after the jump. The larger value shows the more excellent in the jump characteristic.

TABLE 1

| Number of laminated element | $\rho_{25}$ (Ωcm) | Tc (° C.) | Resistance temperature coefficient (%/° C.) |
| --- | --- | --- | --- |
| 1 | 45.0 | 166.2 | 7.6 |
| 2 | 49.1 | 171.3 | 7.9 |
| 3 | 61.2 | 160.7 | 9.1 |
| 4 | 98.7 | 165.4 | 12.2 |

From Table 1, it is realized that the room-temperature resistivity $\rho_{25}$ and the resistance temperature coefficient α increase with the increase in the number of the laminated elements. Therefore, owing to the peculiar effect of the invention that a high resistance is shown in the vicinity of the interface, when the semiconductor ceramic composition according to the invention is used, the PTC element can be applied to uses where high room-temperature resistivity and resistance temperature coefficient are required, with increasing the number of the laminated elements without changing the material itself and thickness of the semiconductor ceramic composition. As above, the laminated structure is suitable for uses where high withstand voltage is required even when the thickness is equal to or smaller than conventional thickness.

Figure 12:
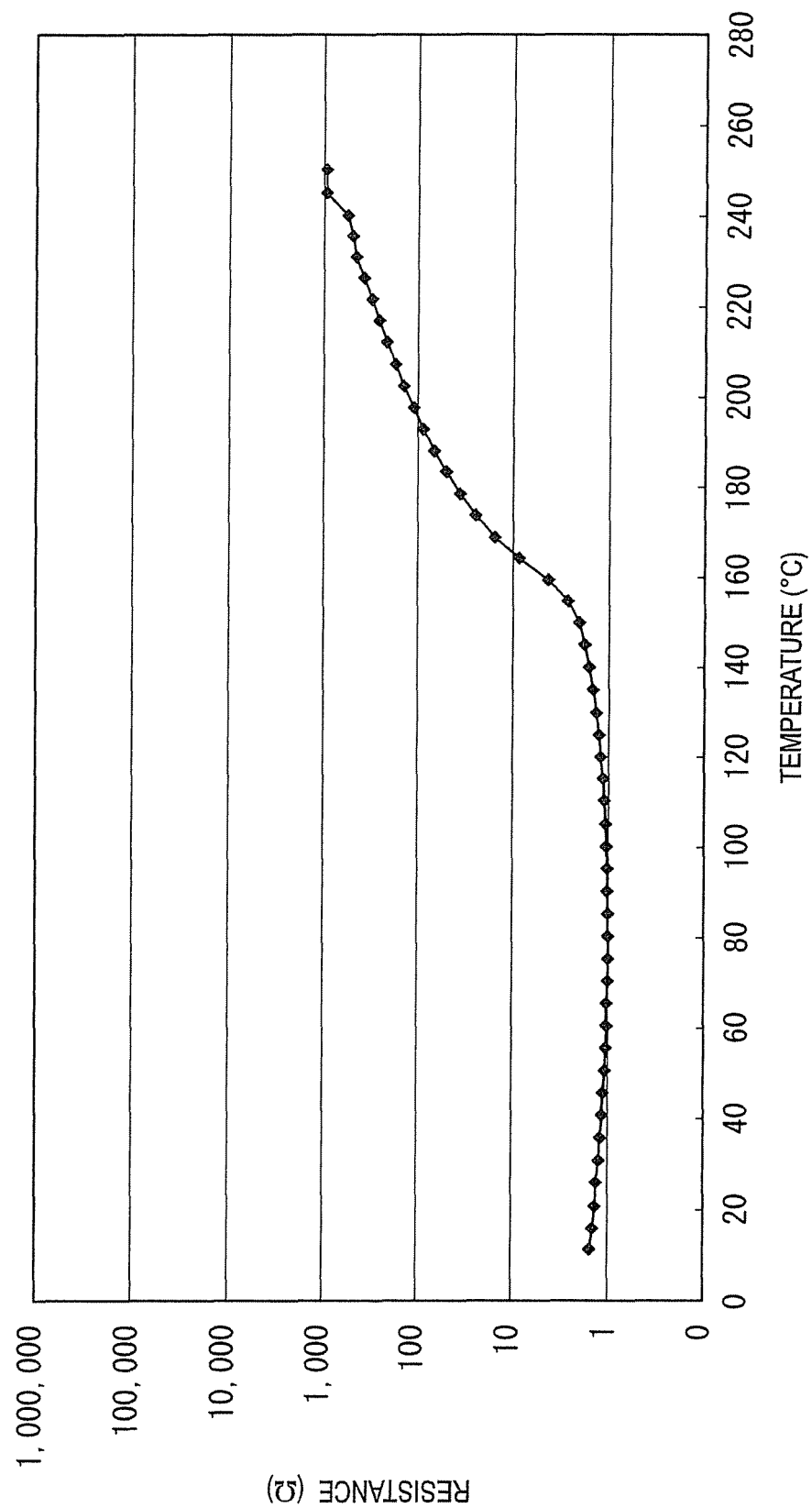
FIG. 12 is a graph showing a relationship between temperature and resistance regarding a semiconductor ceramic composition having plural layers of electrodes according to the invention.
Figure 13:
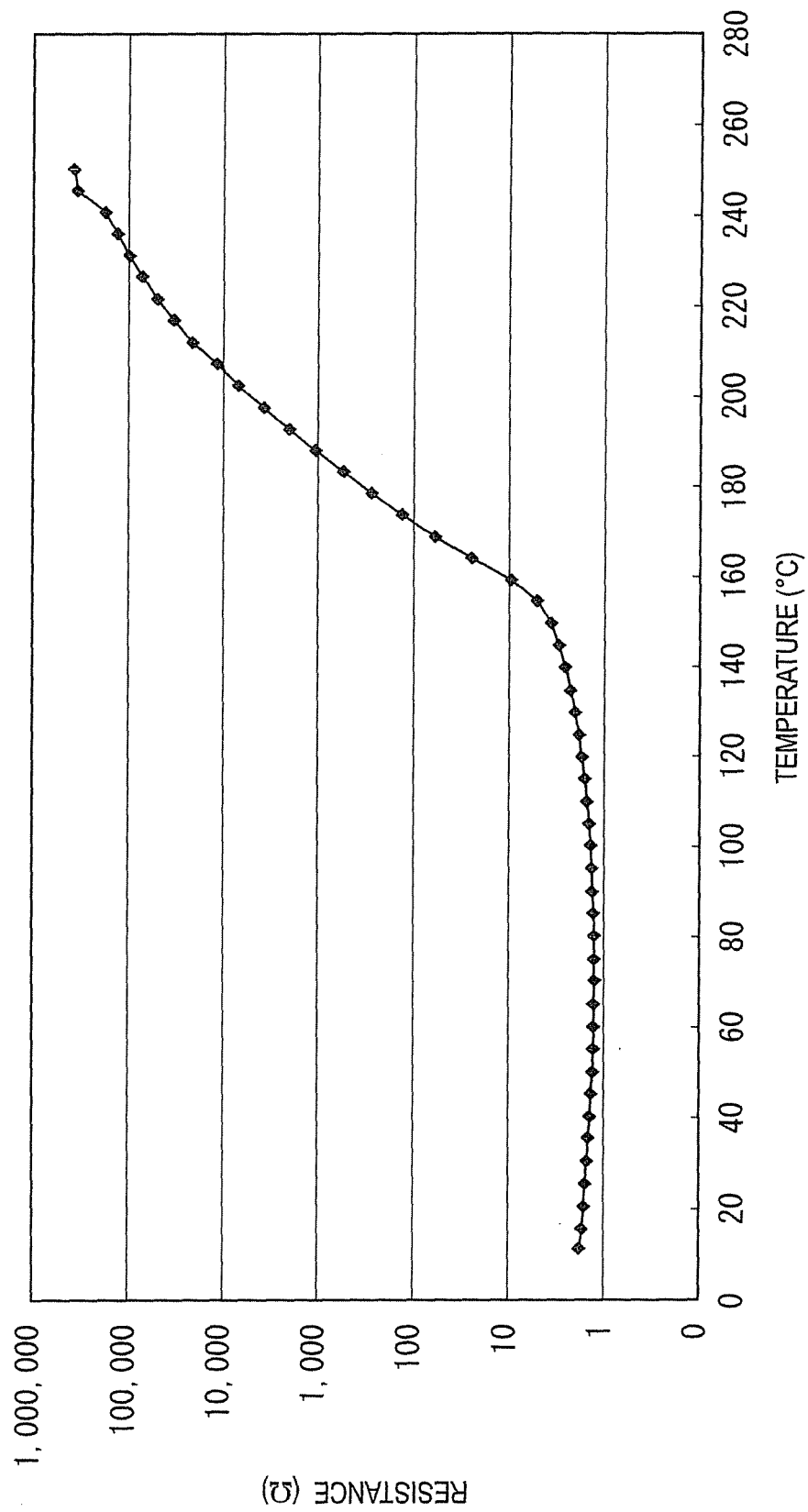
FIG. 13 is a graph showing a relationship between temperature and resistance regarding a semiconductor ceramic composition having plural layers of electrodes according to the invention.
Figure 14:
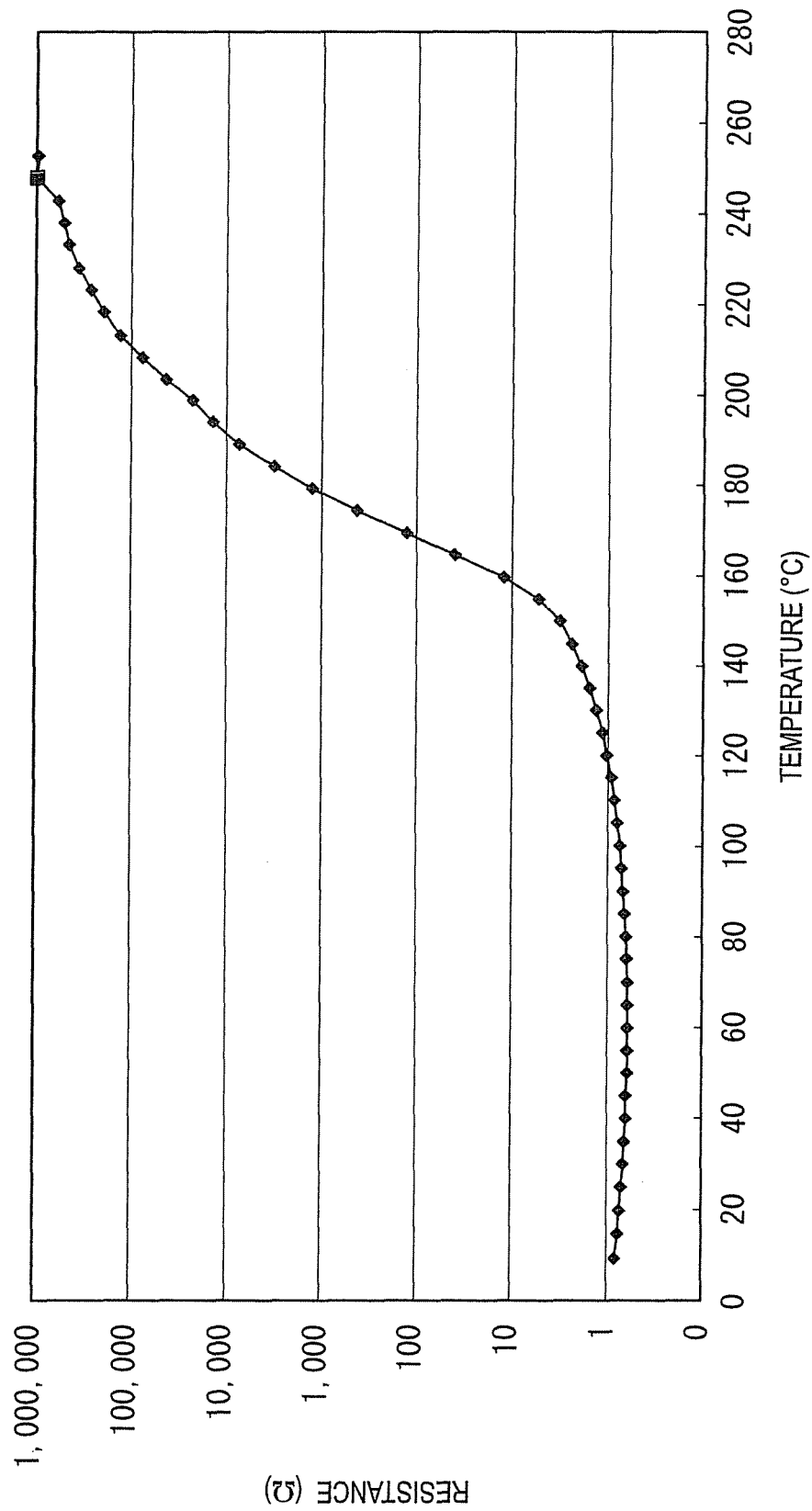
FIG. 14 is a graph showing a relationship between temperature and resistance regarding a semiconductor ceramic composition having plural layers of electrodes according to the invention.

Moreover, in FIG. 12 to FIG. 14, it is confirmed that the jump characteristic appears even when the electrodes are formed by baking or sputtering or the intermediate electrode is formed.

FIG. 12 shows measurement results of temperature-resistance $R_0(T)$ at a thickness of 0 of a test piece where electrodes composed of a silver cover electrode, a nickel intermediate electrode, and a chromium ohmic electrode were formed on both sides of the semiconductor ceramic composition by sputtering and the thermal treatment was not conducted.

FIG. 13 shows measurement results of temperature-resistance $R_0(T)$ at a thickness of 0 of a test piece where electrodes composed of a silver cover electrode, a nickel intermediate electrode, and a chromium ohmic electrode were formed on both sides of the semiconductor ceramic composition by sputtering and the thermal treatment was conducted in the air at 300° C. for 5 hours.

FIG. 14 shows measurement results of temperature-resistance $R_0(T)$ at a thickness of 0 of a test piece where electrodes composed of a silver cover electrode, a nickel intermediate electrode, and a chromium ohmic electrode were formed on both sides of the semiconductor ceramic composition by sputtering and the thermal treatment was conducted in oxygen at 300° C. for 5 hours.

In all the constitutions, the jump characteristic was expressed and particularly, those subjected to the thermal treatment after the electrodes were formed showed an excellent jump characteristic. It seems that this is because the metal (chromium) of the ohmic electrode and the components in the air influence each other by the thermal treatment to increase the density of state of the interface.

As mentioned above, in the PTC element according to the invention, it is confirmed that the jump characteristic is expressed independent of the method for forming the electrodes. Moreover, even in the case of the PTC elements having electrodes derived from the same materials, it is confirmed that the PTC element subjected to the thermal treatment is excellent in the jump characteristic.

From the above investigations, it is confirmed that PTC elements expressing the jump characteristic (PTCR characteristic) at the interface between the electrode and the semiconductor ceramic composition are obtained. In this regard, in the PTC elements expressing the jump characteristic (PTCR characteristic) at the interface between the electrode and the semiconductor ceramic composition, as explained in FIG. 1, a plurality of semiconductor ceramic compositions which have metal electrodes provided on both end faces and are different in thickness one another are prepared, resistances of individual semiconductor ceramic compositions are measured at every predetermined temperature with heating the semiconductor ceramic compositions, an approximation straight line between the thickness and the resistance is determined at every predetermined temperature, a resistance on the approximation straight line at a thickness of 0 is determined at every predetermined temperature, and it is judged that the PTCR characteristic is expressed at the interface between the semiconductor ceramic composition and the electrode at the time when the resistance at a thickness of 0 sharply increases at a specific temperature as a border, whereby a position of expressing the PTCR characteristic can be specified.

<Analysis of Vacancy Content>

Next, the atomic vacancy content in the semiconductor ceramic composition, which influences the above jump characteristic, was considered. For the composition $[(Bi-Na)_x(Ba_{1-y}La_y)_{1-x}]TiO_3$ of the above Example, the vacancy contents of Bi, Ba, Na, and O were analyzed. This is because, although Bi and Na should be theoretically contained in an amount of 0.08 and 0.5 relative to Ti:1, since the values of Bi, Ba, Na, and O were smaller than the theoretical values as a result of analyzing the actual semiconductor ceramic composition, it was presumed that defects are generated at Bi, Ba, Na, and O sites. Accordingly, there was obtained an idea that the degree of the defects may influence the room-temperature resistivity $\rho_{25}$, Curie temperature $T_{sc}$, and resistance temperature coefficient $\alpha$, and hence the analysis was performed.

In this regard, from the obtained analytical results of the semiconductor ceramic composition, La was hardly lost by volatilization during the manufacturing process, so that La was considered no to be a causal site. Moreover, since Ti was most hardly lost by volatilization during the manufacturing process and was stable, the above vacancy contents of Ba, Na, Bi, and O were determined on the basis of the analytical value of Ti.

The quantity of the oxygen defects was determined according to the following calculation formula.

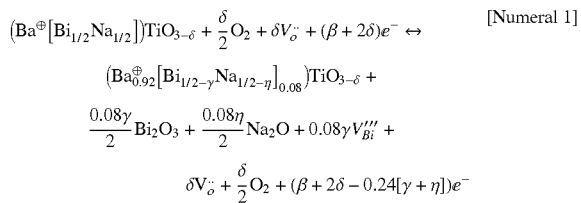

Namely, when $\delta$ defects are generated for oxygen, $2\delta$ pieces of carrier electrons should be generated as compared with the case where no oxygen defects are present. Therefore, the quantity of the oxygen defects can be found by measuring the number of the electrons.

The above analytical results are shown in Table 2. In Examples 1 to 27, blending was performed so that $\gamma$ and $\eta$ in the composition of $(Bi_{0.5-\gamma}Na_{0.5-\eta})TiO_3$ of the BNT powder as a raw material powder are in the range of $0 \leq \gamma \leq 0.35$ and $0 \leq \eta \leq 0.005$ and the resulting blend was baked in the air at 800° C. with controlling the time. For each of the semiconductor ceramic compositions manufactured using the BNT powders and BT powders obtained in respective blend ratios, a silver-zinc electrode as an ohmic electrode and a silver electrode as a cover electrode to be provided thereon were formed on both end faces of the composition and the room-temperature resistivity $\rho_{25}$, Curie temperature $T_{sc}$, and resistance temperature coefficient $\alpha$ were measured. Here, Comparative Examples 1 to 5 where the blend is other than the above are also shown in Table 2.

TABLE 2

| | $\gamma$ | $\eta$ | BNT calcination time (hour) | Electrode material | Method for forming electrode | Ba vacancy content (%) | Na vacancy content (%) | Bi vacancy content (%) |
|---|---|---|---|---|---|---|---|---|
| Example 1 | 0 | 0 | 2 | Ag/Ag—Zn no middle layer electrode | baking | 2.44 | 7.76 | 22.29 |
| Example 2 | 0 | 0*[1] | 2 | | | 2.49 | 0.00 | 19.81 |
| Example 3 | 0 | 0.002 | 2 | | | 0.00 | 17.09 | 16.16 |
| Example 4 | 0 | 0.005 | 2 | | | 2.21 | 59.81 | 18.45 |
| Example 5 | 0 | 0.003 | 2 | | | 2.26 | 36.34 | 18.33 |
| Example 6 | 0 | 0.002 | 2 | | | 2.18 | 16.34 | 18.39 |
| Example 7 | 0 | 0*[2] | 2 | | | 1.07 | 2.93 | 21.88 |
| Example 8 | 0 | 0*[3] | 2 | | | 2.21 | 4.95 | 18.01 |
| Example 9 | 0 | 0 | 2 | | | 2.21 | 6.44 | 18.01 |
| Example 10 | 0.05 | 0 | 2 | | | 2.25 | 6.31 | 24.23 |
| Example 11 | 0.1 | 0 | 2 | | | 2.22 | 6.51 | 34.08 |
| Example 12 | 0.15 | 0 | 2 | | | 2.26 | 6.49 | 46.76 |
| Example 13 | 0.2 | 0 | 2 | | | 2.25 | 6.56 | 53.88 |
| Example 14 | 0.25 | 0 | 2 | | | 2.24 | 6.29 | 63.72 |
| Example 15 | 0.35 | 0 | 2 | | | 2.17 | 6.21 | 74.92 |
| Comparative Example 1 | 0.4 | 0 | 2 | | | 2.11 | 6.30 | 80.30 |
| Comparative Example 2 | 0*[6] | 0 | 2 | | | 2.83 | 7.70 | 3.20 |
| Example 16 | 0 | 0 | 4 | | | 4.00 | 6.80 | 20.40 |
| Comparative Example 3 | 0*[7] | 0*[4] | 2 | | | 0.00 | 0.60 | 1.21 |
| Comparative Example 4 | 0.1 | 0.001 | 4 | | | 2.98 | 8.11 | 30.11 |
| Comparative Example 5 | 0.4 | 0.005 | 2 | | | 2.80 | 58.80 | 80.60 |
| Example 17 | 0 | 0 | 2 | | | 2.31 | 6.33 | 18.01 |
| Example 18 | 0 | 0 | 2 | | | 2.33 | 6.24 | 18.33 |
| Example 19 | 0 | 0 | 2 | | | 2.29 | 6.37 | 18.12 |
| Example 20 | 0 | 0*[1] | 2 | | | 2.53 | 0.00 | 17.77 |
| Example 21 | 0 | 0 | 1 | | | 3.00 | 6.72 | 16.44 |
| Example 22 | 0 | 0 | 2 | | sputtering | 2.31 | 6.36 | 18.21 |
| Example 23 | 0 | 0 | 2 | | | 2.33 | 6.25 | 17.87 |
| Example 24 | 0 | 0 | 2 | | | 2.29 | 6.33 | 18.19 |
| Example 25 | 0 | 0.003 | 4 | | | 2.31 | 35.20 | 19.01 |

TABLE 2-continued

| | | | | | | | | |
|---|---|---|---|---|---|---|---|---|
| Example 26 | 0.25 | 0 | 2 | | | 2.31 | 6.22 | 60.10 |
| Example 27 | 0 | 0 | 2 | | | 2.31 | 6.36 | 18.21 |

| | Quantity of oxygen defect (ppm) | ρ25 (Ωcm) | Tsc (° C.) | Resistance temperature coefficient (%/° C.) | Thermal treatment or additive |
|---|---|---|---|---|---|
| Example 1 | 1 | 50.7 | 155.7 | 8.4 | Ca: 0.425 mol % + SiO2: 1.7 mol % added |
| Example 2 | 1 | 54.9 | 155.1 | 7.8 | SiO2: 1.7 mol % added |
| Example 3 | 1 | 62.6 | 154.7 | 6.7 | none in particular |
| Example 4 | 1 | 50.6 | 156.1 | 8.1 | none in particular |
| Example 5 | 1 | 55.2 | 156.1 | 7.9 | none in particular |
| Example 6 | 1 | 40.0 | 156.1 | 7.7 | none in particular |
| Example 7 | 1 | 53.9 | 158.4 | 6.6 | none in particular |
| Example 8 | 1 | 53.7 | 153.8 | 7.2 | none in particular |
| Example 9 | 1 | 41.3 | 155.6 | 8.5 | none in particular |
| Example 10 | 1 | 62.6 | 155.6 | 8.7 | none in particular |
| Example 11 | 1 | 64.8 | 155.6 | 9.1 | none in particular |
| Example 12 | 1 | 73.9 | 155.6 | 9.4 | none in particular |
| Example 13 | 1 | 88.1 | 155.6 | 9.7 | none in particular |
| Example 14 | 1 | 296.3 | 155.6 | 12.9 | none in particular |
| Example 15 | 1 | 1002.3 | 155.6 | 16.2 | none in particular |
| Comparative Example 1 | 1 | impossible to measure | | | none in particular |
| Comparative Example 2 | 1 | 31.9 | 187.2 | 3.4 | none in particular |
| Example 16 | 1 | 34.8 | 179.9 | 7.2 | none in particular |
| Comparative Example 3 | 1 | 33.5 | impossible to measure | 1.1 | *8 |
| Comparative Example 4 | 20 | 27.6 | impossible to measure | 0.5 | thermally treated at 800° C. in hydrogen for 10 hours |
| Comparative Example 5 | 1 | 301.1 | impossible to decide | 15.5 | The sum of cations is 9.8% of Ti in material |
| Example 17 | 0.1 | 55.5 | 156.1 | 7.0 | none in particular |
| Example 18 | 0.02 | 57.1 | 155.6 | 6.7 | none in particular |
| Example 19 | 10 | 43.8 | 156.3 | 6.2 | none in particular |
| Example 20 | 1 | 53.3 | 154.4 | 7.1 | none in particular |
| Example 21 | 1 | 103.6 | 156.3 | 8.1 | none in particular |
| Example 22 | 1 | 55.5 | 156.1 | 7.0 | none in particular |
| Example 23 | 0.02 | 57.1 | 155.6 | 6.7 | none in particular |
| Example 24 | 10 | 43.8 | 156.3 | 6.2 | none in particular |
| Example 25 | 1 | 51.6 | 156.1 | 7.0 | none in particular |
| Example 26 | 1 | 55.1 | 156.1 | 7.5 | none in particular |
| Example 27 | 1 | 65.3 | 154.0 | 8.5 | thermally treated at 300° C. in the air for 2 hours |

*[1] After BT calcined powder and BNT calcine powder were mixed and granulated, $Na_2CO_3$ was added in amount of 7 mol % based on Ti amount to make Na vacancy content 0%.
*[2] After BT calcined powder and BNT calcine powder were mixed and granulated, $Na_2CO_3$ was added in amount of 3 mol % based on Ti amount to make Na vacancy content 2.9%.
*[3] After BT calcined powder and BNT calcine powder were mixed and granulated, $Na_2CO_3$ was added in amount of 4 mol % based on Ti amount to make Na vacancy content 4.95%.
*[4] After BT calcined powder and BNT calcine powder were mixed and granulated, $Na_2CO_3$ was added in amount of 6.5 mol % based on Ti amount to make Na vacancy content 0.6%.
*[6] After BT calcined powder and BNT calcine powder were mixed and granulated, $Bi_2O_3$ was added in amount of 16 mol % based on Ti amount.
*[7] After BT calcined powder and BNT calcine powder were mixed and granulated, $Bi_2O_3$ was added in amount of 17 mol % based on Ti amount.
*[8] At blending of BT calcined powder, $BaCO_3$ was added in excess of 0.25 mol % to thereby make Ba vacancy content 0%

With regard to the resistance temperature coefficient α, the higher the value is, the more excellent the jump characteristic is, and thus uses are broadened. When the resistance temperature coefficient α is 5.0%/° C. or more, the PTC element can be sufficiently utilized as a PTC element for sensor uses and heater uses. Moreover, since suitable Curie temperature is determined depending on uses of the PTC element, when the Curie temperature may be changed in a certain range, the element can be applied to various uses. In this respect, the semiconductor ceramic composition according to the invention mentioned above can vary the temperature from about 150° C. to about 190° C., the range to which the PTC element of the invention can be applied is said to be broad.

With regard to the room-temperature resistivity, the element of up to about 70 Ωcm is suitable for auxiliary heaters for vehicles, the element of up to about 1000 Ωcm is suitable for steam-generating modules, and the element of 1000 Ωcm or more is suitable for heaters for hybrid vehicles and electric vehicles, heating-element modules, and the like. This is because, when a PTC element having low resistivity is used for parts where high withstand voltage is required, there is a concern that too much electric current flows through other electronic parts to damage the other electronic parts.

From the above characteristic evaluation, when focused to the Bi vacancy content, the resistance temperature coefficient decreases when the Bi vacancy content is lower than 3.20% in Comparative Examples 2 and 3 and the Curie temperature cannot be determined when the Bi vacancy content is larger than 80% as in Comparative Examples 1 and 5, so that the cases are not preferred. Therefore, the vacancy content of Bi is preferably more than 5% and 75% or less relative to the Bi sites.

When the vacancy content of Bi is in the range, an interface having a depletion layer (having a Schottky barrier) is easily configured. Therefore, in order that the Bi vacancy content does not exceed 80%, it is preferred to control an amount of $Bi_2O_3$ to be charged so that γ in $(Bi_{0.5-\gamma}Na_{0.5-\eta})TiO_3$ does not exceed 0.4 at the control stage of the raw material powders.

In the case where γ exceeds 0.4 and becomes extremely large, an extremely large number of a heterogeneous phase, where Bi is lacked from a normal tetragonal phase, is formed, so that it is preferred to volatilize Bi as far as possible at the calcination or sintering stage. Thereby, Bi defects can be formed in the tetragonal phase with suppressing the heterogeneous phase formation to the minimum.

For the same reason, with regard to Na to be mentioned later, η is also preferably as small as possible. Since Ba has a low saturated vapor pressure and thus cannot be volatilized at the calcination or sintering stage, the content is controlled by dissolving Ba into water at the preparation stage of the raw material powder.

Furthermore, as shown in Comparative Example 4, in the case where the quantity of the oxygen defects exceeds 10 ppm and is 20 ppm, the semiconductor ceramic composition does not show the jump characteristic, so that the quantity of the oxygen defects is preferably 10 ppm or less.

In this regard, from the above investigation, the vacancy content of Bi is considered to be a component which directly influences the jump characteristic of the semiconductor ceramic composition but, when the formation of the heterogeneous phase in the semiconductor ceramic composition is considered, it is preferred that the vacancy content of Ba is more than 0% and 4% or less, further preferably 3% or less relative to the Ba sites. Moreover, the vacancy content of Na is preferably more than 0% and 60% or less relative to the Na sites.

Namely, in the case where the semiconductor ceramic composition is controlled so that the vacancy content of Ba exceeds 4% or the vacancy content of Na exceeds 60%, the jump characteristic is expressed but vacancy ratio of Ba or Na in the semiconductor ceramic composition becomes too large to form a regular crystal structure and heterogeneous phases are formed, so that the case is not preferred. Moreover, when it is considered that the aforementioned jump characteristic is expressed at the interface between the metal and the semiconductor ceramic composition and the jump characteristic is influenced by the vacancy contents of Bi and O, a depletion layer is considered to be present at the interface between the metal and the semiconductor ceramic composition.

As above, since the depletion layer is considered to be present at the interface between the metal and the semiconductor ceramic composition, the depletion layer of the PTC element where electrodes are provided on the semiconductor ceramic composition was confirmed using a scanning capacitance microscope SCM (Scanning Capacitance Microscopy).

Figure 15:
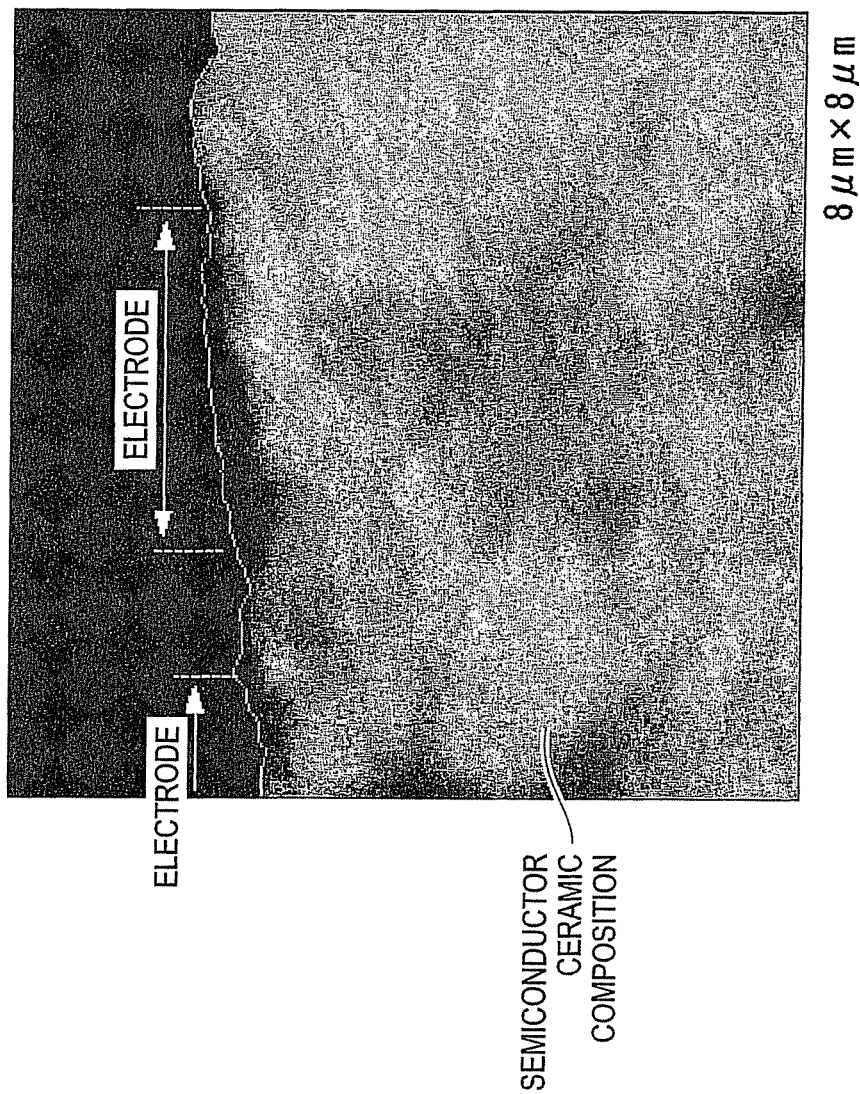
FIG. 15 is an SCM image when electric capacitance on the surface of a PTC element of the invention is investigated with a scanning capacity microscope.

FIG. 15 is an SCM image obtained by investigating electric capacitance of the surface of the PTC element where electrodes are provided on a part of the surface of the semiconductor ceramic composition on a scanning capacitance microscope (manufactured by Veeco Company, Model: NanoScope Iva AFM Dimension 3100). Moreover, FIG. 16 is a schematic view which traces crystal grain boundaries in FIG. 15 and shows the density of electric capacitance of the depletion layer at three stages.

The electric capacitance C of the depletion layer is proportional to the square root of donor density, i.e., density of state at the interface between the semiconductor ceramic composition and the electrode, as the following (Numeral 2). The region having high density of state also has a large electric capacitance C and appears with deep color. FIGS. 15 and 16 are results of observing change in electric capacitance with changing the voltage to be applied to the interface between the semiconductor ceramic composition and the electrode. In FIGS. 15 and 16, it is shown that the region having higher density has larger electric capacitance.

Figure 16:
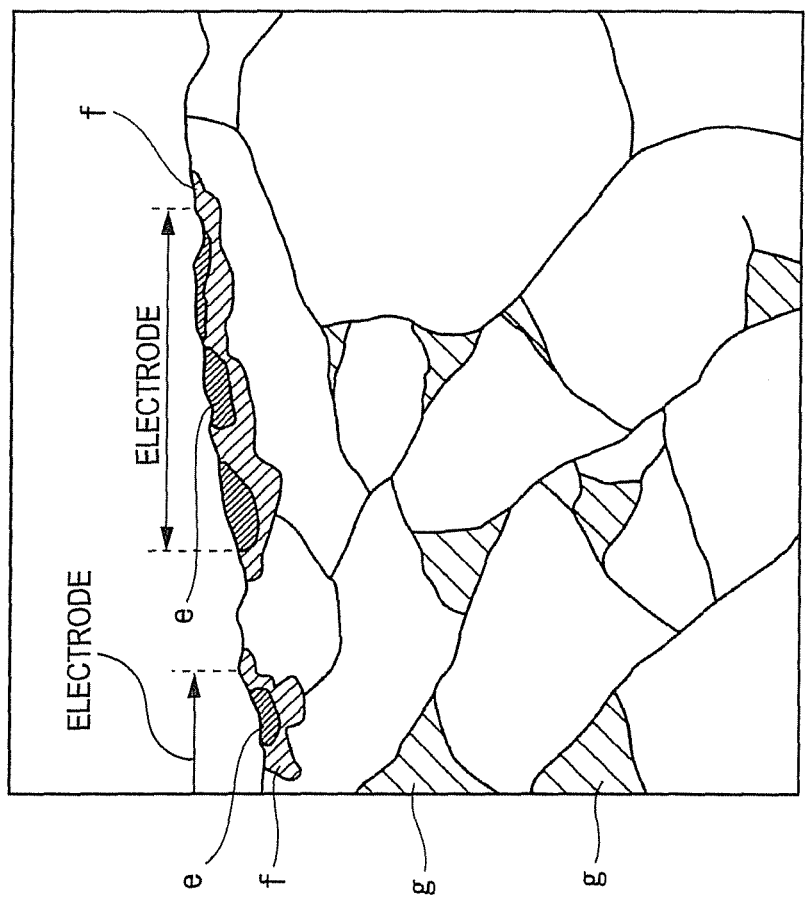
FIG. 16 is a schematic view which traces FIG. 15 and shows the density of the depletion layers at three stages.

From FIGS. 15 and 16, the regions e having large electric capacitance, i.e., high density of state or the regions f having medium electric capacitance/density of state appeared in the vicinity of the interface where the electrode was formed and it can be confirmed that many depletion layers were formed in the regions. On the other hand, the regions having small electric capacitance, i.e., low density of state appeared on the end faces and the inside of the semiconductor composition at which the electrode was not formed and it is confirmed that these regions were regions g where, even when the depletion layers were present, the density was low. Since the density of state increases as the Bi vacancy content increases, it is presumed that the depletion layer is formed to a degree that the jump characteristic can be expressed.

When the vacancy contents are deviated from these ranges, the density of state at the interface increases, so that the resistance temperature coefficient becomes less than 5%/° C., the jump characteristic is not exhibited, the room-temperature resistivity is too large, or the resistance cannot be measured.

Among the definition of these defect/vacancy contents, the Bi defects are considered to have high influence on the Schottky barrier at the electrode/material interface. This is because the resistance and the jump characteristic are remarkably expressed in the case where Bi is little.

When the region having high density of state is shown in (b) in FIG. 5, it is a peek part of the steeply rising Schottky barrier in the vicinity of the interface. Here, the width w of the Schottky barrier (width of the depletion layer) at the interface of the metal and the semiconductor ceramic composition is determined according to the following (Numeral 3). The expression shows that the width w of the region showing the Schottky barrier is inversely proportional to the electric capacitance C. When the (Numeral 3) is considered, the width $w_e$ of the region showing the Schottky barrier in the region e showing large electric capacitance C is narrower than the width $w_f$ of the region f showing medium electric capacitance C and this fact is coincident with the results of FIGS. 15 and 16. As a result of calculation, it was found that the width (depth) $w_e$ of the depletion layer in the high density region e in the vicinity of the interface was 0.04 to 0.8 μm and the width (depth) $w_f$ of the depletion layer in the medium density region f was about 2 μm.

$$C = \{q \in N_D / 2(V_d - V)\}^{1/2} \quad \text{[Numeral 2]}$$

q: elementary charge, ∈: dielectric constant, $N_D$: donor density (density of state), $V_d$: diffusion potential, V: applied voltage $$w = \{2 \in (V_d - V)/qN_D\}^{1/2} = \in (V_d - V)/C \quad \text{[Numeral 3]}$$

Moreover, in the case where the vacancy contents of Ba, Na, Bi, and O are changed as above, it can be confirmed from Table 3 that the room-temperature resistivity $\rho_{25}$, Curie temperature $T_{sc}$, and resistance temperature coefficient α are similarly influenced also in the case of using electrodes other than silver/silver-zinc electrodes.

TABLE 3

| | γ | η | BNT calcination time (hour) | Electrode material | Method for forming electrode | Ba vacancy content (%) | Na vacancy content (%) | Bi vacancy content (%) | Quantity of oxygen defect (ppm) | ρ25 (Ωcm) | Tsc (° C.) | Resistance temperature coefficient (%/° C.) | Thermal treatment or additive |
|---|---|---|---|---|---|---|---|---|---|---|---|---|---|
| Example 28 | 0 | 0 | 2 | Ni/Ti no middle layer electrode | sputtering | 2.29 | 6.36 | 18.21 | 1 | 55.5 | 156.1 | 7.0 | none in particular |
| Example 29 | 0 | 0 | 2 | | | 2.38 | 6.33 | 17.87 | 0.02 | 47.7 | 155.6 | 6.7 | none in particular |
| Example 30 | 0 | 0 | 2 | | | 2.29 | 6.33 | 18.22 | 10 | 43.1 | 156.3 | 6.2 | none in particular |
| Example 31 | 0 | 0.003 | 2 | | | 2.31 | 38.8 | 19.37 | 1 | 45.1 | 156.1 | 8.0 | none in particular |
| Example 32 | 0.25 | 0 | 2 | | | 2.36 | 6.16 | 59.40 | 1 | 49.3 | 156.1 | 7.0 | none in particular |
| Example 33 | 0 | 0 | 2 | | | 2.29 | 6.36 | 18.21 | 1 | 67.2 | 153.7 | 8.2 | thermally treated at 300° C. in the air for 2 hours |
| Example 34 | 0 | 0 | 2 | Ag/Ni no middle layer electrode | sputtering (Ag baking) | 2.38 | 6.31 | 18.42 | 1 | 52.9 | 155.5 | 6.7 | thermally treated at 300° C. in the air for 2 hours |
| Example 35 | 0 | 0 | 2 | | | 2.22 | 6.31 | 18.11 | 0.02 | 45.9 | 155.8 | 6.5 | none in particular |
| Example 36 | 0 | 0 | 2 | | | 2.44 | 6.41 | 18.19 | 10 | 44.3 | 154.9 | 6.3 | none in particular |
| Example 37 | 0 | 0.003 | 2 | | | 2.36 | 34.9 | 17.99 | 1 | 41.1 | 156.4 | 7.5 | none in particular |
| Example 38 | 0.25 | 0 | 2 | | | 2.38 | 6.52 | 59.40 | 1 | 45.6 | 155.7 | 8.0 | none in particular |
| Example 39 | 0 | 0 | 2 | | | 2.38 | 6.31 | 18.42 | 1 | 70.4 | 154.9 | 8.4 | thermally treated at 300° C. in the air for 2 hours |
| Example 40 | 0 | 0 | 2 | Ag/Ni/Cr | | 2.4 | 6.32 | 18.42 | 1 | 52.9 | 155.5 | 6.7 | none in particular |
| Example 41 | 0 | 0 | 2 | | | 2.36 | 6.55 | 18.11 | 0.02 | 45.9 | 155.8 | 6.5 | none in particular |
| Example 42 | 0 | 0 | 2 | | | 2.47 | 6.41 | 18.19 | 10 | 44.3 | 154.9 | 6.3 | none in particular |
| Example 43 | 0 | 0 | 2 | | | 2.37 | 34.9 | 17.99 | 1 | 41.1 | 156.4 | 7.9 | none in particular |
| Example 44 | 0 | 0.003*5 | 2 | | | 2.43 | 48.3 | 18.03 | 1 | 44.4 | 155.3 | 8.1 | none in particular |
| Example 45 | 0.25 | 0 | 2 | | | 2.41 | 6.52 | 59.40 | 1 | 45.6 | 155.7 | 8.0 | none in particular |
| Example 46 | 0.35 | 0 | 2 | | | 2.59 | 6.29 | 70.13 | 1 | 66.5 | 154.2 | 8.5 | none in particular |
| Example 47 | 0 | 0 | 2 | | | 2.4 | 6.32 | 18.42 | 1 | 71.9 | 155.0 | 7.9 | thermally treated at 300° C. in hydrogen for 2 hours |
| Comparative Example 6 | 0.35 | 0 | 6 | | | 2.19 | 6.3 | 88.22 | 1 | impossible to measure | | | none in particular |
| Example 48 | 0 | 0 | 2 | Al | sputtering | 2.68 | 6.66 | 18.91 | 1 | 53.2 | 156.1 | 7.0 | none in particular |
| Example 49 | 0 | 0 | 2 | | | 2.33 | 6.46 | 18.56 | 0.02 | 47.1 | 155.3 | 6.7 | none in particular |
| Example 50 | 0 | 0 | 2 | | | 2.47 | 6.29 | 18.22 | 10 | 46.2 | 154.2 | 6.6 | none in particular |
| Example 51 | 0 | 0.003 | 2 | | | 2.29 | 38.9 | 16.39 | 1 | 41.1 | 157.2 | 8.0 | none in particular |
| Example 52 | 0.25 | 0 | 2 | | | 2.31 | 6.71 | 58.70 | 1 | 46.4 | 155.1 | 7.7 | none in particular |
| Example 53 | 0 | 0 | 2 | | | 2.41 | 6.25 | 18.73 | | | | | |
| Example 54 | 0 | 0 | 2 | Ti/Cu no intermediate electrode | | 2.28 | 7.11 | 19.33 | | | | | |
| Example 55 | 0 | 0.001 | 2 | | | 2.52 | 8.1 | 19.33 | | | | | |
| Example 56 | 0 | 0 | 2 | | | 2.22 | 6.17 | 19.19 | | | | | |
| Example 57 | 0 | 0.003 | 2 | | | 2.68 | 41.6 | 18.63 | | | | | |
| Example 58 | 0.25 | 0 | 2 | | | 2.44 | 7.19 | 62.16 | | | | | |
| Example 59 | 0 | 0 | 2 | | | 2.38 | 6.25 | 18.42 | | | | | |

TABLE 3-continued

| | | | | | |
|---|---|---|---|---|---|
| Example 53 | 1 | 71.8 | 154.3 | 8.5 | thermally treated at 300° C. in the air for 2 hours |
| Example 54 | 1 | 53.2 | 156.1 | 6.0 | none in particular |
| Example 55 | 0.02 | 51.9 | 158.8 | 6.1 | none in particular |
| Example 56 | 10 | 49.5 | 151.8 | 7.0 | none in particular |
| Example 57 | 1 | 47.8 | 152.9 | 7.8 | none in particular |
| Example 58 | 1 | 48.9 | 153.5 | 7.3 | thermally treated at 300° C. in the air for 2 hours |
| Example 59 | 1 | 68.1 | 154.3 | 8.1 | none in particular |

*[5]At Bt-BNT mixing, washed with 60 L of pure water three times (dissolution of Na into water)

As above, according to the invention, there can be realized a novel PTC element which expresses the PTCR characteristic at the interface between the metal and the $BaTiO_3$ system semiconductor ceramic composition. Also, from Table 3, it can be confirmed that the jump characteristic is not exhibited when the Bi vacancy content exceeds 75% (Comparative Example 6).

<Heating-Element Module>

Figure 17:
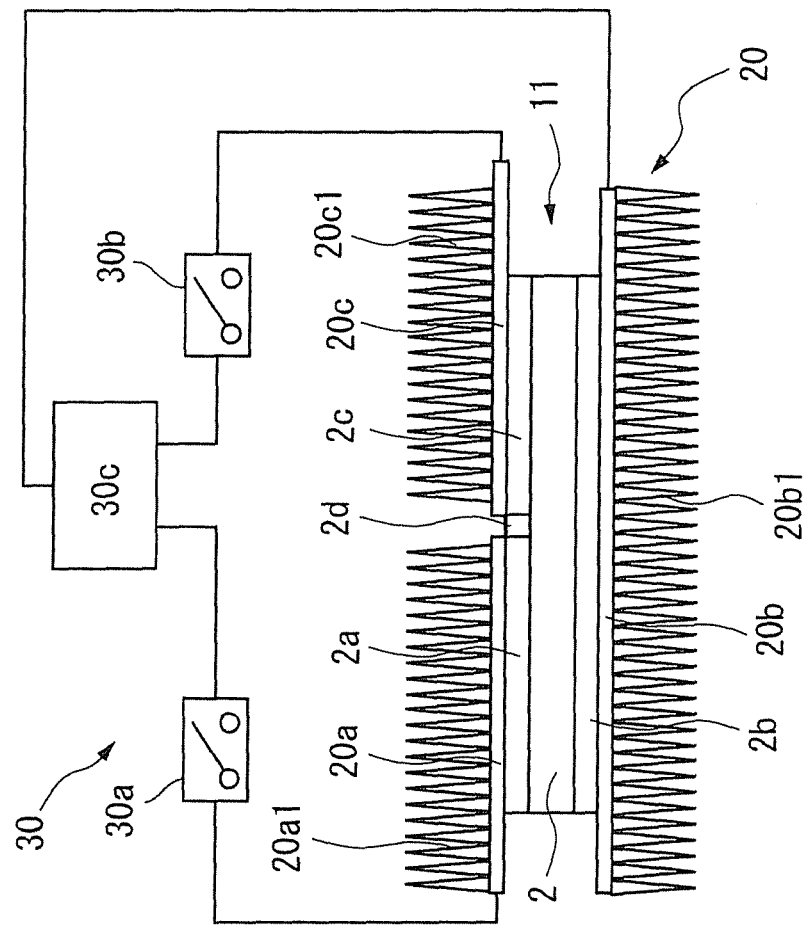
FIG. 17 is a schematic view showing a heating apparatus 30 using a heating-element module of the invention.

The PTC element of the invention was fixed by sandwiching it among radiating fins 20a1, 20b1, and 20c1 as shown in FIG. 17 to obtain a heating-element module 20. Electrodes 2a and 2c formed on one face of a heating element 11 are thermally and electrically closely attached to power supply electrodes 20a and 20c, respectively, and an electrode 2b formed on another face is thermally and electrically closely attached to a power supply electrode 20b.

Moreover, the power supply electrodes 20a, 20b, and 20c are thermally connected to the radiating fins 20a1, 20b1, and 20c1. An insulating layer 2d is provided between the power supply electrode 20a and the power supply electrode 20c to insulate the both electrically. The heat generated at the heating element 11 is transmitted to the electrodes 2a, 2b, and 2c, the power supply electrodes 20a, 20b, and 20c, and the radiating fins 20a1, 20b1, and 20c1 in the order and is released into the atmosphere mainly from the radiating fins 20a1, 20b1, and 20c1.

When a power source 30c is connected between the power supply electrode 20a and the power supply electrode 20b or the power supply electrode 20c and the power supply electrode 20b, power consumption becomes small. When the power source 30c is connected between both of the power supply electrode 20a and the power supply electrode 20c and the power supply electrode 20b, the power consumption becomes large. That is, it is possible to change the power consumption in two stages. Thus, the heating-element module 20 can switch the heating capacity according to the load situation of the power source 30c and the desired degree of requirement for rapid or slow heating.

A heating apparatus 30 can be configured by connecting the heating-element module 20 capable of switching the heating capacity to the power source 30c. In this regard, the power source 30c may be either direct current one or alternative current one. The power supply electrode 20a and the power supply electrode 20c of the heating-element module 20 are connected in parallel to one electrode of the power source 30c through separate switches 30a and 30b and the power supply electrode 20b is connected as a common terminal to another electrode of the power source 30c.

When either of the switch 30a or 30b is only put on, the heating capacity is small and the load on the power source 30c can be lightened. When both are put on, the heating capacity can be enlarged.

Moreover, according to the heating apparatus 30, the element 2 can be maintained at a constant temperature without equipping the power source 30c with a particular mechanism. That is, when the element 2 having the PTCR characteristic is heated to around the Curie temperature, the resistance of the element 2 sharply increases and the flow of the current through the element 2 decreases, so that the material is no more heated automatically. Moreover, when the temperature of the element 2 lowers from the Curie temperature, the current is again allowed to flow through the element and the element 2 is heated. Since the temperature of the element 2 and also the whole heating-element module 20 can be made constant through repetition of such a cycle, a circuit for regulating the phase and width of the power source 30c and also a temperature detecting mechanism or a mechanism for comparison with a target temperature, a circuit for controlling power for heating, and the like are also unnecessary.

The heating apparatus 30 can heat air with introducing air between the radiating fins 20a1 to 20c1 or can heat a liquid such as water with connecting a metal tube for liquid flow between the radiating fins 20a1 to 20c1. On this occasion, since the element 2 is also kept at a constant temperature, a safe heating apparatus 30 can be configured.

Figure 18:
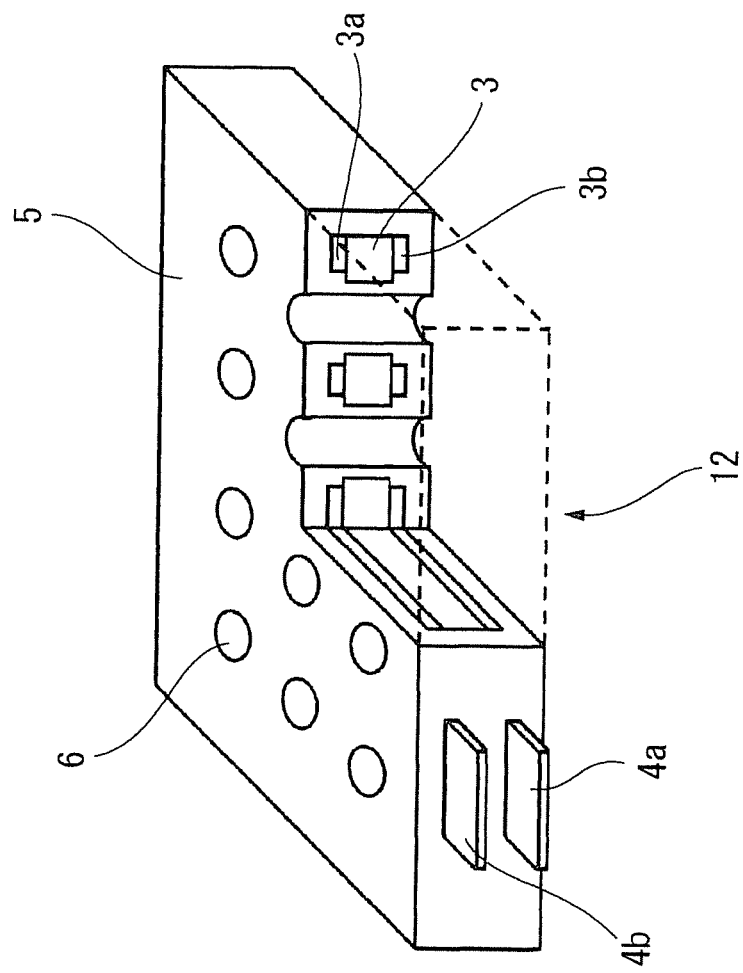
FIG. 18 is a perspective view showing a heating-element module 12 according to Modified Example of the invention, with cutting a portion thereof.

Furthermore, a heating-element module 12 according to a modified example of the invention will be explained with reference to FIG. 18. Incidentally, the heating-element module 12 is shown with cutting a part thereof for the purpose of illustration in FIG. 18.

The heating-element module 12 is an approximately flat rectangular module and has a element 3 obtained by processing a semiconductor ceramic composition of Example into an approximately rectangular shape, electrodes 3a and 3b provided on upper and lower faces of the element 3, an insulating coating layer 5 covering the element 3 and the electrodes 3a and 3b, and outgoing electrodes 4a and 4b connected to the electrodes 3a and 3b, respectively, and exposed from the insulating coating layer 5 toward outside. In the heating-element module 12, there are provided a plurality of through-holes 6 which penetrate the upper and lower faces of the heating-element module 12 and whose inner peripheral faces are covered with the insulating coating layer 5.

The heating-element module 12 can be made as follows. First, in the element 3 obtained by processing the semiconductor ceramic composition of Example 1, a plurality of holes penetrating the element 3 in a thickness direction are formed. Next, the electrodes 3a and 3b are formed on both faces of the element 3 excluding opening peripheries at which the holes open on the upper and lower faces of the element 3. In this regard, the electrodes 3a and 3b are formed by printing with overlaying an ohmic electrode and a surface electrode as mentioned above. Furthermore, after the outgoing electrode 4a and 4b are provided, the whole of the element 3 and the electrodes 3a and 3b is covered with an insulating coating agent so that the outgoing electrodes 4a and 4b are exposed toward outside to form the insulating coating layer 5, thereby obtaining the heating-element module 12. At the formation of the insulating coating layer 5, the inner peripheral faces of the holes of the element 3 are covered with the insulating coating layer 5 to form the through-holes 6.

The heating-element module 12 can heat a fluid by introducing the fluid into the through-holes 6. On this occasion, since the element 3 and the electrodes 3a and 4a through which an electric current is allowed to flow are covered with the insulating coating layer 5, they do not come into direct contact with the fluid, so that a conductive liquid can be heated. Therefore, the heating-element module 12 is suitable for uses where fluids having electric conductivity, such as a salt solution, are instantaneously heated.

The invention claimed is:

1. A PTC element comprising at least two metal electrodes and a BaTiO3 system semiconductor ceramic composition arranged between said electrodes,
    wherein, in said semiconductor ceramic composition, a portion of Ba in the BaTiO3 system is substituted by Bi—Na and a semiconductorizing element, vacancies are formed on at least Bi sites, and oxygen defects are formed on a crystal thereof.

2. The PTC element according to claim 1, wherein a vacancy content of Bi is more than 5% and 75% or less relative to the Bi sites.

3. The PTC element according to claim 1, wherein the oxygen defects are 10 ppm or less relative to O sites.

4. The PTC element according to claim 1, wherein vacancies are formed on Na sites in addition to the Bi sites and a vacancy content of Na is more than 0% and 60% or less relative to the Na sites.

5. The PTC element according to claim 1, wherein vacancies are formed on Ba sites in addition to the Bi sites and a vacancy content of Ba is more than 0% and 4% or less relative to the Ba sites.

6. The PTC element according to claim 1,
    wherein a depletion layer is present in the vicinity of an interface between said metal electrode and said semiconductor ceramic composition.

7. The PTC element according to claim 6, wherein the depletion layer is present within 2 μm from the interface between said metal electrode and said semiconductor ceramic composition.

8. The PTC element according to any one of claim 1, which is obtained by laminating said electrodes and said semiconductor ceramic composition.

9. A heating-element module comprising the PTC element according to claim 1 and a power supply electrode provided on the PTC element.

10. The PTC element according to claim 2, wherein the oxygen defects are 10 ppm or less relative to O sites.

11. The PTC element according to claim 2, wherein vacancies are formed on Na sites in addition to the Bi sites and a vacancy content of Na is more than 0% and 60% or less relative to the Na sites.

12. The PTC element according to claim 3, wherein vacancies are formed on Na sites in addition to the Bi sites and a vacancy content of Na is more than 0% and 60% or less relative to the Na sites.

13. The PTC element according to claim 2, wherein vacancies are formed on Ba sites in addition to the Bi sites and a vacancy content of Ba is more than 0% and 4% or less relative to the Ba sites.

14. The PTC element according to claim 3, wherein vacancies are formed on Ba sites in addition to the Bi sites and a vacancy content of Ba is more than 0% and 4% or less relative to the Ba sites.

15. The PTC element according to claim 4, wherein vacancies are formed on Ba sites in addition to the Bi sites and a vacancy content of Ba is more than 0% and 4% or less relative to the Ba sites.

16. The PTC element according to claim 2, which is obtained by laminating said electrodes and said semiconductor ceramic composition.

17. The PTC element according to claim 3, which is obtained by laminating said electrodes and said semiconductor ceramic composition.

18. The PTC element according to claim 4, which is obtained by laminating said electrodes and said semiconductor ceramic composition.

19. A heating-element module comprising the PTC element according to claim 2 and a power supply electrode provided on the PTC element.

20. A heating-element module comprising the PTC element according to claim 3 and a power supply electrode provided on the PTC element.

* * * * *